United States Patent
McDougle

(10) Patent No.: US 10,135,331 B2
(45) Date of Patent: Nov. 20, 2018

(54) POWER FACTOR CORRECTION FOR LED DRIVERS

(71) Applicant: LEDVANCE LLC, Wilmington, MA (US)

(72) Inventor: Anthony N. McDougle, Lafayette, CO (US)

( * ) Notice: Subject to any disclaimer, the term of this patent is extended or adjusted under 35 U.S.C. 154(b) by 0 days.

(21) Appl. No.: 15/453,809

(22) Filed: Mar. 8, 2017

(65) Prior Publication Data

US 2017/0271979 A1 Sep. 21, 2017

Related U.S. Application Data

(60) Provisional application No. 62/305,445, filed on Mar. 8, 2016.

(51) Int. Cl.
| | |
|---|---|
| H02M 1/42 | (2007.01) |
| H05B 33/08 | (2006.01) |
| H02M 3/335 | (2006.01) |
| H02M 1/00 | (2006.01) |

(52) U.S. Cl.
CPC ....... H02M 1/4258 (2013.01); H02M 1/4225 (2013.01); H05B 33/0809 (2013.01); H02M 3/33523 (2013.01); H02M 2001/007 (2013.01); Y02B 70/126 (2013.01)

(58) Field of Classification Search
None
See application file for complete search history.

(56) References Cited

U.S. PATENT DOCUMENTS

| | | | |
|---|---|---|---|
| 5,459,375 A | 10/1995 | Nilssen | |
| 7,233,115 B2 | 6/2007 | Lys | |
| 7,679,292 B2 | 3/2010 | Allen et al. | |
| 8,242,766 B2 * | 8/2012 | Gaknoki | H05B 33/0815 323/246 |
| 9,030,122 B2 | 5/2015 | Yan et al. | |
| 9,621,029 B2 * | 4/2017 | Gritti | H02M 1/4258 |
| 2004/0196669 A1 * | 10/2004 | Thrap | H02M 1/4258 363/19 |
| 2008/0224629 A1 | 9/2008 | Melanson | |
| 2009/0310387 A1 * | 12/2009 | Lu | H02M 3/3376 363/21.03 |
| 2011/0068700 A1 | 3/2011 | Fan | |
| 2012/0092900 A1 * | 4/2012 | Orr | H02M 1/4208 363/21.03 |

* cited by examiner

Primary Examiner — Minh D A
Assistant Examiner — James H Cho

(57) ABSTRACT

A power factor correction circuit, and methods of operation, is described, that can downconvert AC mains power to a lower power suitable for driving one or more LEDs. The power factor correction circuit can provide a regulated current, in a single-stage embodiment, and a regulated voltage, in a dual-stage embodiment. The power factor correction circuit can include an isolation transformer along with a switch for controlling downconversion. The power factor correction circuit can alternatively include a switch without isolation. Either way, the switch can have a duty cycle proportional to a desired downconversion from the AC mains signal, and can skip half cycles of the AC mains signal in order to reduce the downconverted output of the power factor correction circuit.

15 Claims, 19 Drawing Sheets

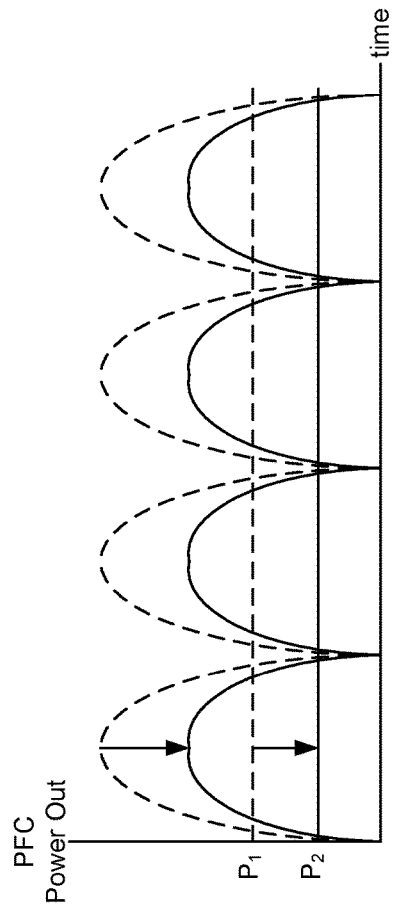
FIG.7a
(PRIOR ART)
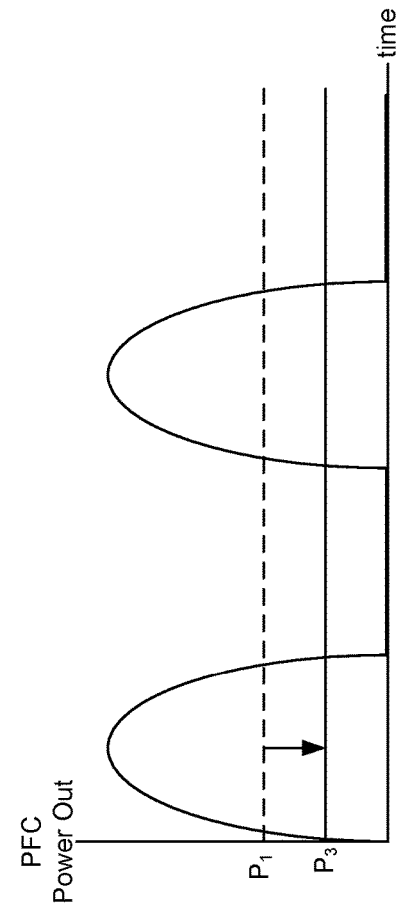
FIG. 7b
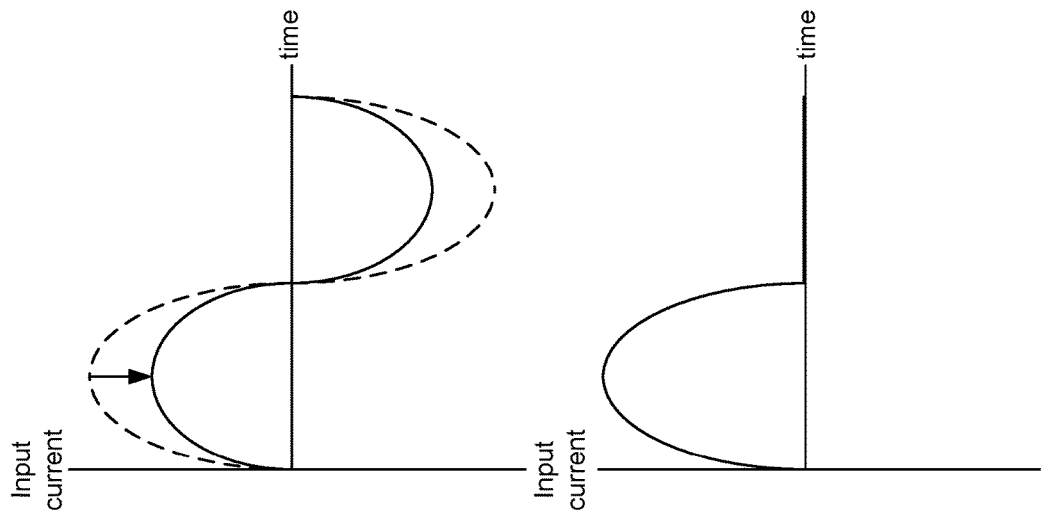

POWER FACTOR CORRECTION FOR LED DRIVERS

CLAIM OF PRIORITY UNDER 35 U.S.C. § 119

The present Application for Patent claims priority to Provisional Application No. 62/305,445 entitled "POWER FACTOR CORRECTION FOR LED DRIVERS" filed Mar. 8, 2016, and assigned to the assignee hereof and hereby expressly incorporated by reference herein.

FIELD OF THE DISCLOSURE

The present disclosure relates generally to LED drivers. In particular, but not by way of limitation, the present disclosure relates to systems, methods and apparatuses for power factor correction in LED drivers.

DESCRIPTION OF RELATED ART

Lighting comprises approximately 17.5% of global electricity consumption. As the world transitions from incandescent to solid state lighting (SSL) technology (e.g., LED bulbs), utilities and government regulatory agencies worldwide are concerned that, as this large segment of the consumption base switches to SSL, it will increase infrastructure costs.[1] This is due to the reactive nature of LED-based solid state lighting (i.e., voltage and current not being in phase), which results in higher distribution currents that adversely affect power factor (PF) and, in turn create a larger demand on the power grid.

[1] http://www.ledlighting-eetimes.com/en/power-factor-and-solid-state-lighting-implications-complications-and-resolutions.html?cmp_id=71&news_id=222908451

Power factor is defined as the ratio of the reactive power to the real power (i.e., the percentage of generated power can be used to do work). This basically means that for an equivalent real power consumed by a highly reactive load, for example 5 W, the actual current that the grid needs to supply to the load in order to provide the real power has to be higher than the real power by the power factor ratio. For the previous 5 W example, for a load with a PF of 0.5, the grid needs to provide 2× the current actually required by the load at any given time. When multiplied by tens of thousands of households and numerous SSL devices per household, one sees how improvements in power factor can vastly reduce the amount of power that utilities need to generate per customer. This adverse impact on the power grid does not apply to incandescent lighting, which is purely resistive and has a unity power factor.

LEDs have a non-linear impedance as do their drivers, causing the power factor to be inherently low. In order to combat this, some LED drivers are design to compensate for power factor, and may have a goal of achieving a power factor as close to 1 or unity as possible. Solid state lighting that incorporates power factor correction can reduce the impact of the change from incandescent to LED based lighting by increasing the power factor to near unity by adding circuitry to the LED driver that corrects for the reactive input impedance.

Utilities are not the only ones interested in LED drivers with high power factor correction. Regulators have been working with utility companies to enact rigid standards to control the impact of solid state lighting technology on the power grid. This is because, while LED lighting reduces the theoretical power draw on the grid, if power factor is not adequately addressed, then some of the gains made by the switch to LED lighting may be lost inefficient power transfer (i.e., poor power factor correction for LED lighting).

Historically, incandescent bulbs have had near-perfect power factor. Therefore, solid state lighting is being held to a much higher power factor standard compared to legacy AC/DC incandescent power supplies. In most cases, power supplies are free from any form of power factor regulation for supplies rated up to 75 W. However, for solid state lighting, power factor regulations typically kick in for loads as low as 5 W or below, thus covering the vast majority of LED bulbs. Therefore, there is a need in the art for better power factor correction in LED drivers.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as a method of operating a power factor correction circuit to drive a dimmable solid state lighting device. The method can include controlling downconversion of a voltage in the power factor correction circuit by periodically switching a switch coupled between a high voltage rail and a ground rail of the power factor correction circuit, where a duty cycle of the switch corresponds to a ratio of input and output voltages from the power factor correction circuit. The method also can include identifying zero crossings of power on the high voltage rail. The method also can include determining a period of the power from the monitoring. The method further can include turning the switch off for half cycles of the period to reduce average power output from the power factor correction circuit, where a frequency of the turning the switch off corresponds to a ratio of input to output power from the power factor correction circuit.

Other embodiments of the disclosure may also be characterized as a method of operating a power factor correction circuit to drive a dimmable solid state lighting device. The method can include controlling downconversion of a voltage in the power factor correction circuit by periodically switching a switch coupled between a high voltage rail and a ground rail of the power factor correction circuit, where a duty cycle of the switch corresponds to a ratio of input and output voltages from the power factor correction circuit. The method can yet further include providing a transformer circuit between the high voltage rail and the switch to isolate a primary from a secondary side of the power factor correction circuit. The method can also include identifying zero crossings of power before or after the transformer circuit or via a second primary coil of the transformer circuit. The method can also include determining a period of the power from the monitoring. The method can also include turning the switch off for half cycles of the period to reduce average power output from the power factor correction circuit, where a frequency of the turning the switch off corresponds to a ratio of input to output power from the power factor correction circuit.

Other embodiments of the disclosure can be characterized as a power factor correction circuit. The circuit can include a power factor correction circuit input, a power factor correction circuit output, a high voltage rail, a ground rail, a switch, and a controller. The switch can be coupled between the high voltage rail and the ground rail. The controller can control switching of the switch at a duty cycle corresponding to a downconversion ratio between a voltage at the input and a voltage at the output. The controller can be programmed, coded, or wired to (1) control the downconversion by periodically switching the switch; (2) identify zero crossings of power on the high voltage rail at an isolation transformer coupled between the high voltage rail and the switch, or at the output; (3) determine a period of the power from the monitoring; and (4) turn the switch off for half cycles of the period to reduce average power output from the power factor correction circuit, where a frequency of the turning the switch off corresponds to a ratio of input to output power from the power factor correction circuit.

Other aspects of the disclosure can be characterized as a non-transitory, tangible computer readable storage medium, encoded with processor readable instructions to perform a method of operating a power factor correction circuit to drive a dimmable solid state lighting device. The method can include controlling downconversion of a voltage in the power factor correction circuit by periodically switching a switch coupled between a high voltage rail and a ground rail of the power factor correction circuit, where a duty cycle of the switch corresponds to a ratio of input and output voltages from the power factor correction circuit. The method also can include identifying zero crossings of power on the high voltage rail. The method also can include determining a period of the power from the monitoring. The method further can include turning the switch off for half cycles of the period to reduce average power output from the power factor correction circuit, where a frequency of the turning the switch off corresponds to a ratio of input to output power from the power factor correction circuit.

Other aspects of the disclosure can be characterized as a non-transitory, tangible computer readable storage medium, encoded with processor readable instructions to perform a method of operating a power factor correction circuit to drive a dimmable solid state lighting device. The method can include controlling downconversion of a voltage in the power factor correction circuit by periodically switching a switch coupled between a high voltage rail and a ground rail of the power factor correction circuit, where a duty cycle of the switch corresponds to a ratio of input and output voltages from the power factor correction circuit. The method can yet further include providing a transformer circuit between the high voltage rail and the switch to isolate a primary from a secondary side of the power factor correction circuit. The method can also include identifying zero crossings of power before or after the transformer circuit or via a second primary coil of the transformer circuit. The method can also include determining a period of the power from the monitoring. The method can also include turning the switch off for half cycles of the period to reduce average power output from the power factor correction circuit, where a frequency of the turning the switch off corresponds to a ratio of input to output power from the power factor correction circuit.

Yet other aspects of the disclosure can be characterized as a power factor correction circuit. The circuit can include a rectification circuit having an AC mains input and a rectified power output. The circuit can also include a regulated voltage output that can be configured to provide regulated voltage to a voltage to current converter configured to provide regulated current to one or more LEDs. The circuit can also include a switch having one side coupled to ground. The circuit can also include a transformer circuit having a primary side coupled between a non-grounded side of the switch and the rectified power output of the rectification circuit, and a secondary side coupled to the regulated voltage output. The circuit can yet further include a controller in communication with the switch. The controller can include a tangible computer readable storage medium, encoded with processor readable instructions to perform a method for adjusting power at the regulated voltage output by controlling the switch. The method can include (1) periodically switching the switch, a duty cycle of the switching controlling a full power output at the regulated voltage output; (2) measuring a period of a power signal before the rectification circuit, between the rectification circuit and the transformer circuit, or after the transformer circuit; and (3) turning the switch off for half cycles of the period with a frequency proportional to a desired reduction in the power output at the regulated voltage output.

Another aspect of the disclosure can be characterized as a system including an AC mains input, a rectifier circuit, a power factor correction circuit, a voltage to current conversion circuit, a controller circuit, a wireless radio, and one or more additional devices. The rectifier circuit can be coupled to the AC mains input and configured to rectify AC mains power into an oscillating signal with no negative voltage. The power factor correction circuit can be coupled to the rectifier circuit and configured to adjust the oscillating signal such that a power factor of an output from the power factor correction circuit is improved as compared to the oscillating signal. The voltage to current conversion circuit can be coupled between the power factor correction circuit and a first of one or more LEDs, the voltage to current conversion circuit configured to convert the output from the power factor correction circuit to a regulated current that drives the one or more LEDs. The controller circuit can be coupled to the power factor correction circuit and the voltage to current conversion. The wireless radio can be coupled to the controller circuit and configured to provide remote access and control to the power factor control circuit and the voltage to current conversion circuit. The one or more additional devices can be coupled to the output of the power factor correction circuit, and can be configured to receive regulated power from the power factor correction circuit. These one or more additional devices may not need their own power factor correction circuitry. These one or more additional devices may be selected from the group consisting of: sensors, lighting drivers, user interface devices, and actuators.

Yet another aspect of the disclosure can include a system including two or more LED lighting systems, and a gateway device. The gateway device can be configured for coupling to the Internet and having a radio and configured to be in wireless communication with the two or more LED lighting systems. At least one of the LED lighting systems can include an AC mains input, a rectifier circuit, a power factor correction circuit, a controller circuit, a wireless radio, and one or more additional devices. The rectifier circuit can be coupled to the AC mains input and configured to rectify AC mains power into an oscillating signal with no negative voltage. The power factor correction circuit can be coupled to the rectifier circuit and configured to adjust the oscillating signal such that a power factor of an output from the power factor correction circuit. The voltage to current conversion circuit can be coupled between the power factor correction circuit and a first of one or more LEDs. The voltage to current conversion circuit can be configured to convert the output from the power factor correction circuit to a regulated current that drives the one or more LEDs. The controller circuit can be coupled to the power factor correction circuit and the voltage to current conversion circuit. The wireless radio can be coupled to the controller circuit and can be configured to provide remote access and control to the power factor control circuit and the voltage to current conversion circuit. The one or more additional devices coupled to the output of the power factor correction circuit, and can be configured to receive regulated power from the power factor correction circuit. These one or more additional devices may not need their own power factor correction circuitry, and may be selected from the group consisting of: sensors, lighting drivers, user interface devices, and actuators.

BRIEF DESCRIPTION OF THE DRAWINGS

FIG. 7a illustrates plots of input current and PFC power output as a function of time for two output states of an LED driver according to traditional methods of reducing output power from a PFC circuit;

FIG. 7b illustrates plots of input current and PFC power output as a function of time for two output states of an LED driver according to an embodiment of a new LED driver;

FIG. 8a illustrates switching states and power outputs corresponding to FIG. 7a;

DETAILED DESCRIPTION

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present disclosure. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Integrated Wireless Radio and LED Driver

Known commercial and residential lighting systems sometimes include wireless radios (e.g., WIFI, ZIGBEE, Z-WAVE, etc.) to communicate with a hub, gateway, or directly with the Internet, thereby enabling remote and scheduled control of lights. Typically wireless radios and LED drivers are separate devices and thus the combined systems are often bulky, complex, and costly. A first aspect of this disclosure is an LED driver that includes a wireless radio as part of the LED driver rather than as a separate device.

Figure 1:
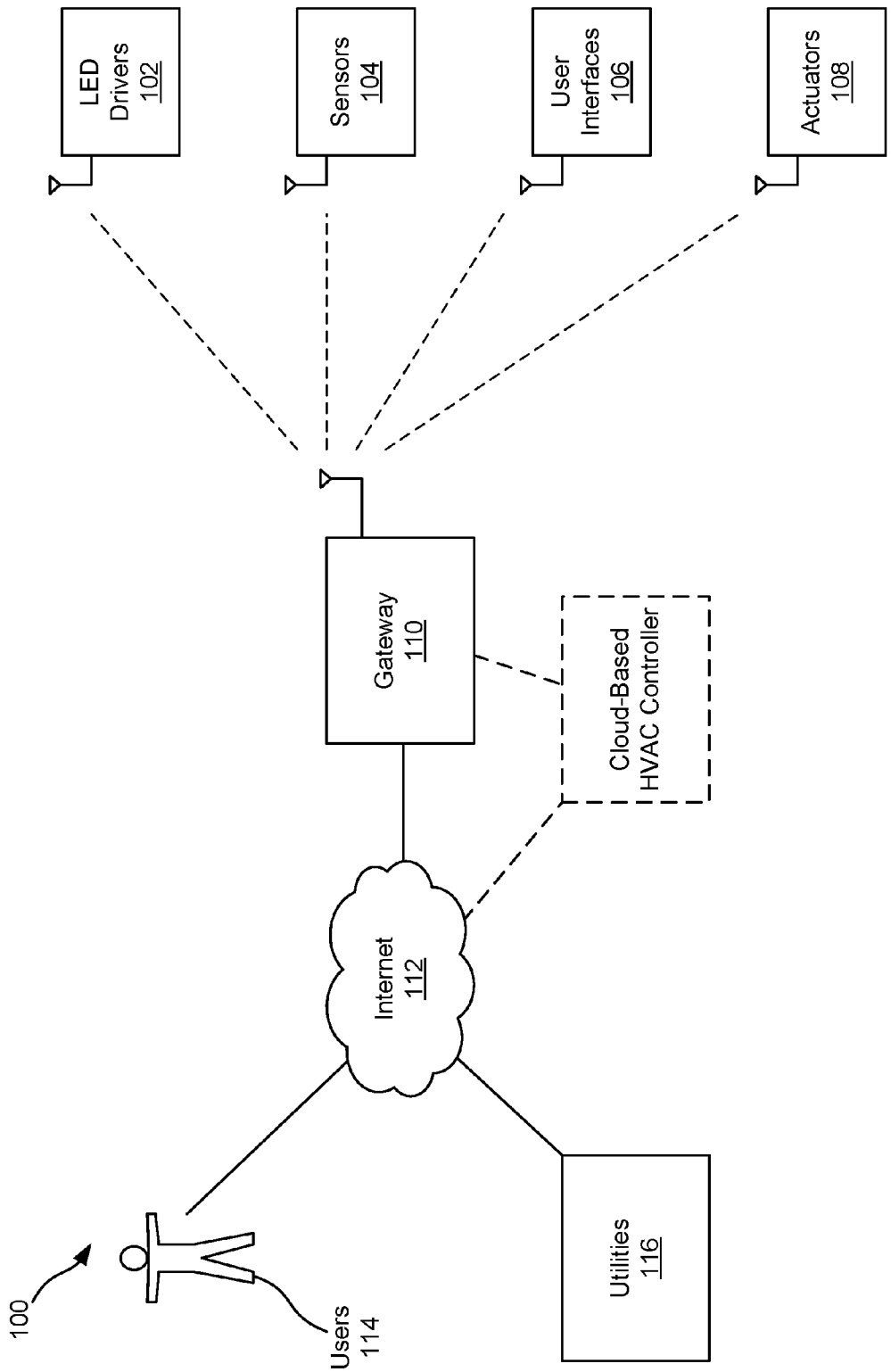
FIG. 1 illustrates a system where various devices, such as LED drivers, sensors, user interfaces, and actuators, can wirelessly interface with the Internet via a gateway and an internal network including the gateway and one or more of the radio-enabled devices.

FIG. 1 illustrates a system where various devices, such as LED drivers, sensors, user interfaces, and actuators, can wirelessly interface with the Internet via a gateway 110 and an internal network including the gateway 110 and one or more of the radio-enabled devices 102, 104, 106, 108. In this way, one or more users 114 can monitor and control light switches, motion sensors, powered window blinds, garage doors, door locks, cameras, etc. Similarly, utilities 116 (e.g., power, water, and gas companies) can remotely monitor and optionally control (with user authorization) devices such as lights and HVAC controls.

Each of the radio-enabled devices 102, 104, 106, 108 can include a driver, where the drivers each include an integrated wireless radio. The gateway 110 can also include a wireless radio, and wireless communication connections can be made between a given device 102, 104, 06, 108 and the gateway 110. The gateway 110 is in communication with the Internet 112 either directly, or via one or more intermediary devices, such as switches, routers, modems, etc. The gateway 110 can interface between different communication protocols. For instance, the wireless signals may use ENOCEAN, ZIG-BEE, Z-WAVE, BLUETOOTH, WIFI, and/or infrared (IR) to name a few non-limiting examples. The Internet 112 may use TCP/IP, to name one non-limiting example. Thus, the gateway 110 interfaces between the protocol used to communicate with the Internet 112, and the protocol used to wirelessly communicate with the radio-enabled devices 102, 104, 106, 108. In some cases, the gateway 110 may be able to handle more than one wireless protocol. For instance, LED drivers 102 may communicate via Z-WAVE, while the actuators 108 communicate via ENOCEAN. In another example, some actuators 108 may use ENOCEAN while others use WIFI. In an embodiment, each LED driver 102 can include or have an attached accessory such as, but not limited to, a sensor 104, user interface 106, or actuator 108. In an embodiment, each LED driver 102, via power from a power supply, can supply power to accessories of the LED driver 102 such as, but not limited to, a sensor 104, user interface 106, or actuator 108. In some instances, this power can be delivered to accessories of the LED driver 102 via a bus having one or more data and power channels, where a battery backup system is coupled to the bus, and may include a control circuit for receiving data and sending data and instructions on the bus. The LED driver 102 may also be able to power any controller or microprocessor of any of the sensors 104, user interfaces 106, actuators 108, or other accessories.

The LED drivers 102 can each be coupled between the AC mains and one or more LED lights. Often, LED drivers and the lights they drive are manufactured and/or sold as a single hardware system, so those of skill in the art will appreciate that the illustrated and described LED drivers 102 may or may not include driven LED lights.

In an embodiment, the LED drivers 102 can each include two control circuits: one in the wireless radio translates data to a defined protocol such as ENOCEAN, ZIGBEE, Z-WAVE, WIFI, etc., and one communicates with a feedback sensor in each LED driver 102 and collects data (e.g., run time, temperature, power usage, etc.). In some embodiments, a single control circuit can perform both duties.

Daisy-Chained Devices with a Single AC Mains Connection

Known commercial and residential lighting systems often include separate rectifying and power factor correction circuitry for each light. A second aspect of this disclosure is a system of lights and/or other devices (e.g., sensors) wherein one LED driver includes a rectifying circuit and power factor correction (PFC), while other devices coupled to the first or primary LED driver do not include rectifying circuits and PFC. In particular, the PFC from the first or primary LED can provide one or more regulated voltage outputs (controlled voltage; floating current) that are used to power and drive one or more additional devices (such as other lights, sensors, or lighting accessories). In this way, a system of lights can be implemented where only a single rectification circuit and a single power factor correction circuit is needed for any number of lights. Additionally, since the output of the PFC is low voltage (e.g., 5V-50V), the wiring between the primary LED driver and the additional devices is low voltage and thus less regulated than typical high voltage (e.g., 120V) connections between lights. As seen, such a system benefits from: (1) only requiring a single rectification circuit and PFC per system of lights; and (2) enabling low voltage connections between lights that would otherwise require high voltage connections therebetween.

Figure 2:
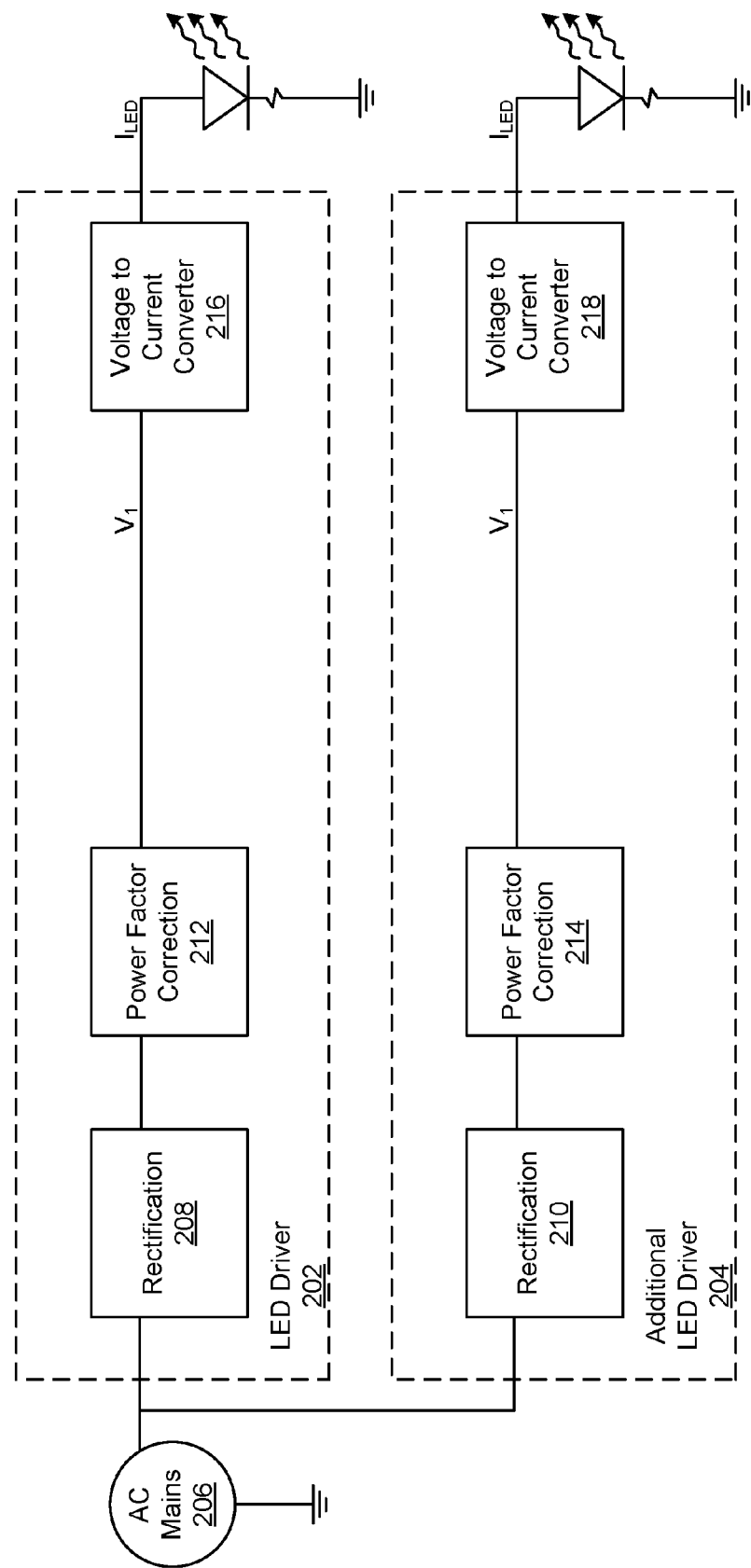
FIG. 2 illustrates a pair of LED drivers driving a pair of one or more LED lights. Each LED driver includes a connection to an AC mains, a rectification circuit, a power factor correction circuit, and a voltage to current converter.

FIG. 2 illustrates a pair of LED drivers driving a pair of one or more LED lights. Each LED driver 202, 204 includes a connection to an AC mains 206, a rectification circuit 208, 210, a power factor correction circuit 212, 214, and a voltage to current converter 216, 218.

Figure 3:
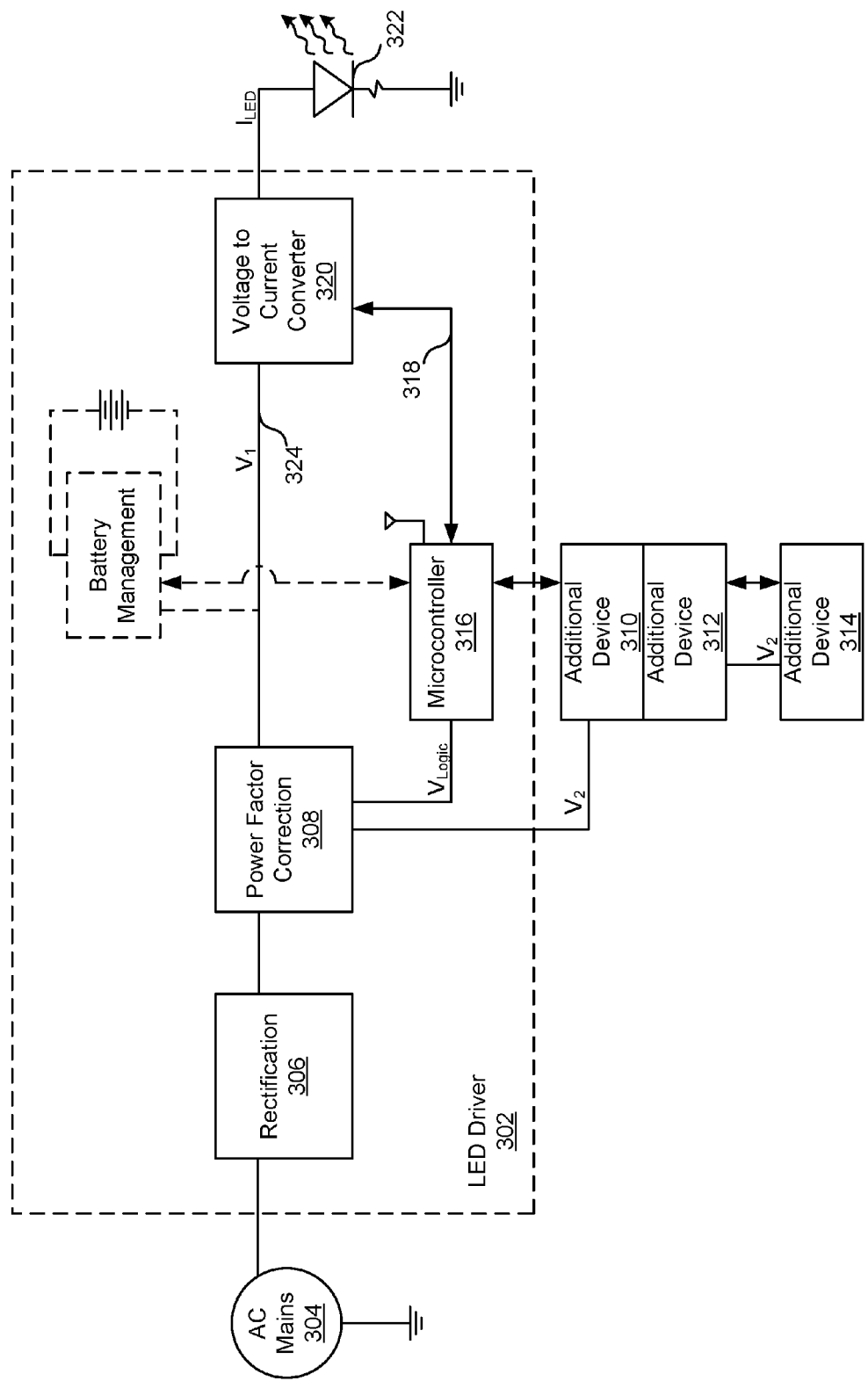
FIG. 3 illustrates a plurality of devices, where only a first LED driver is coupled to an AC mains, and where only the first LED driver has a rectification circuit and a power factor correction circuit.

In contrast, FIG. 3 illustrates a plurality of devices, where only a first LED driver 302 is coupled to an AC mains 304, and where only the first LED driver 302 has a rectification circuit 306 and a power factor correction circuit 308. The power factor correction circuit 308 provides three different regulated voltages, $V_1$, $V_{Logic}$, and $V_2$, where $V_1$ is provided to further circuitry within the first LED driver 302, and $V_2$ is used to power the additional devices 310, 312, 314. In this way, the additional devices can be manufactured without their own rectification and power factor correction circuits.

Additionally, the first LED driver 302 can include a microcontroller 316 with a wireless radio. The wireless radio can be used to communicate with a gateway, such as the gateway 110 in FIG. 1. In the illustrated embodiment, the microcontroller 316 is powered by an output from the power factor correction circuit 308. Further, in this case the microcontroller 316 voltage, $V_{logic}$, is different than $V_1$ and $V_2$. However, in other embodiments, the microcontroller 316 can be powered by another power source. Additionally, in another embodiment, the voltage to the microcontroller 316 can be the same as $V_1$ and $V_2$ (see, for instance, FIG. 4). The microcontroller 316 can include a data connection 318 to a voltage to current converter 320, and can be configured to monitor the voltage to current converter 320 and provide instructions to the voltage to current converter 320. For instance, the microcontroller 316 can instruct the voltage to current converter 320 to adjust its current output, $I_{LED}$, and thereby change a brightness of the one or more LED lights 322. One implementation of this ability is for a utility or user to monitor the brightness of the one or more LEDs 322 through the wireless radio of the microcontroller 316 and the data connection 318. The user or utility can then control the brightness or power consumption of the one or more LEDs 322 via this same control path in response to the monitoring.

In some cases, each device 302, 310, 312, 314 can include its own microcontroller and wireless radio. However, this embodiment shows a single microcontroller 316 controlling each device 302, 310, 312, 314. For instance, if the additional devices 310, 312, 314 are other LED drivers, then the microcontroller 316 can include a data connection to the voltage to current converter in each of the additional LED drivers. In this way, a single microcontroller 316 and a single wireless radio can be used to enable remote and wireless monitoring and control of the additional LED drivers. If the additional devices 310, 312, 314 are other than LED drivers, then the data monitoring and control from the microcontroller 316 can monitor and control key aspects or circuits within those devices. For instance, with a light switch, the microcontroller 316 can monitor a state of the switch and send instructions to flip a state of the switch. For an HVAC control device, the microcontroller 316 can monitor sensors of the HVAC control device, such as temperature, humidity, and user inputs to the HVAC control device, while at the same time being able to send commands to change the temperature. These are just a few examples of the interactions between the microcontroller 316 and the additional devices 310, 312, 314.

Figure 4:
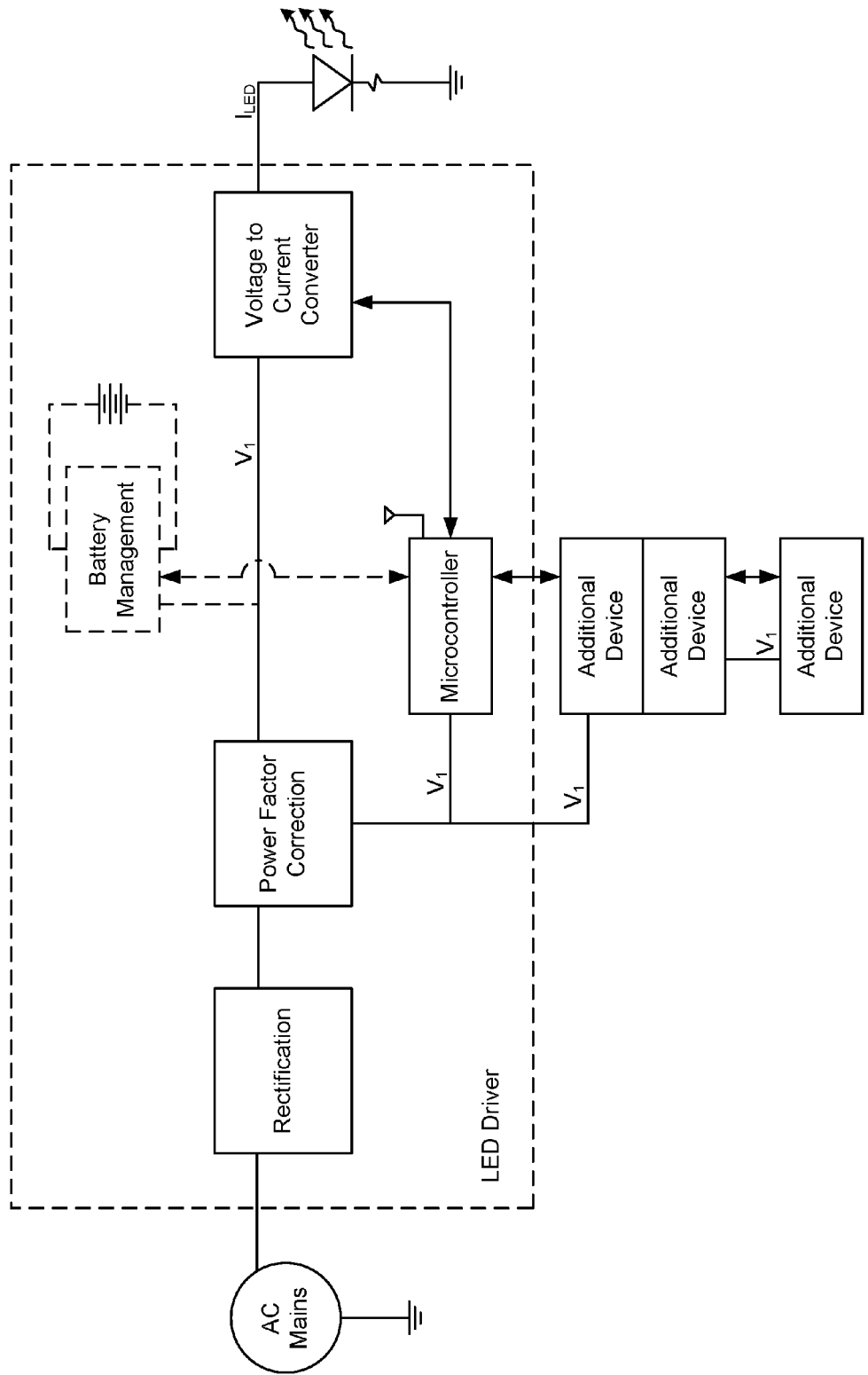
FIG. 4 illustrates another plurality of devices.

To provide multiple voltages from the power factor correction circuit 308, the power factor correction circuit 308 can include a multi-tap transformer. Each tap can provide a separate voltage, for instance, $V_1$ from the first tap, $V_{Logic}$ from the second tap, and $V_2$ from the third tap. Each tap can include a different number of windings or other property that allows each tap to provide a separate voltage. Where a multi-tap transformer or some other means of providing separate voltages is not used, the power factor correction circuit 316 can provide a single voltage output as seen in FIG. 4. In this case, there may be a need to include additional voltage conversion circuits at each of the additional devices and possibly at the microcontroller.

Although not illustrated, in some embodiments, the microcontroller 316 can include one or more data connections to the power connection 324 between the power factor correction circuit 308 and the voltage to current converter 320. The microcontroller 316 can include one or more data connections to an output from the voltage to current converter 320. Each of these optional data connections can be used to monitor $V_1$ and $I_{LED}$ as well as other properties of the power both within and when exiting the LED driver 302.

One can see that $V_2$ is provided to the first additional device 310 and then to the second and third additional devices 312, 314 via internal circuitry of those additional devices 312, 314. While this setup can be beneficial in some situations, it is not required, and thus in other embodiments, the voltage, $V_2$, may be provided directly to two or more of the additional devices 310, 312, 314.

Figure 5:
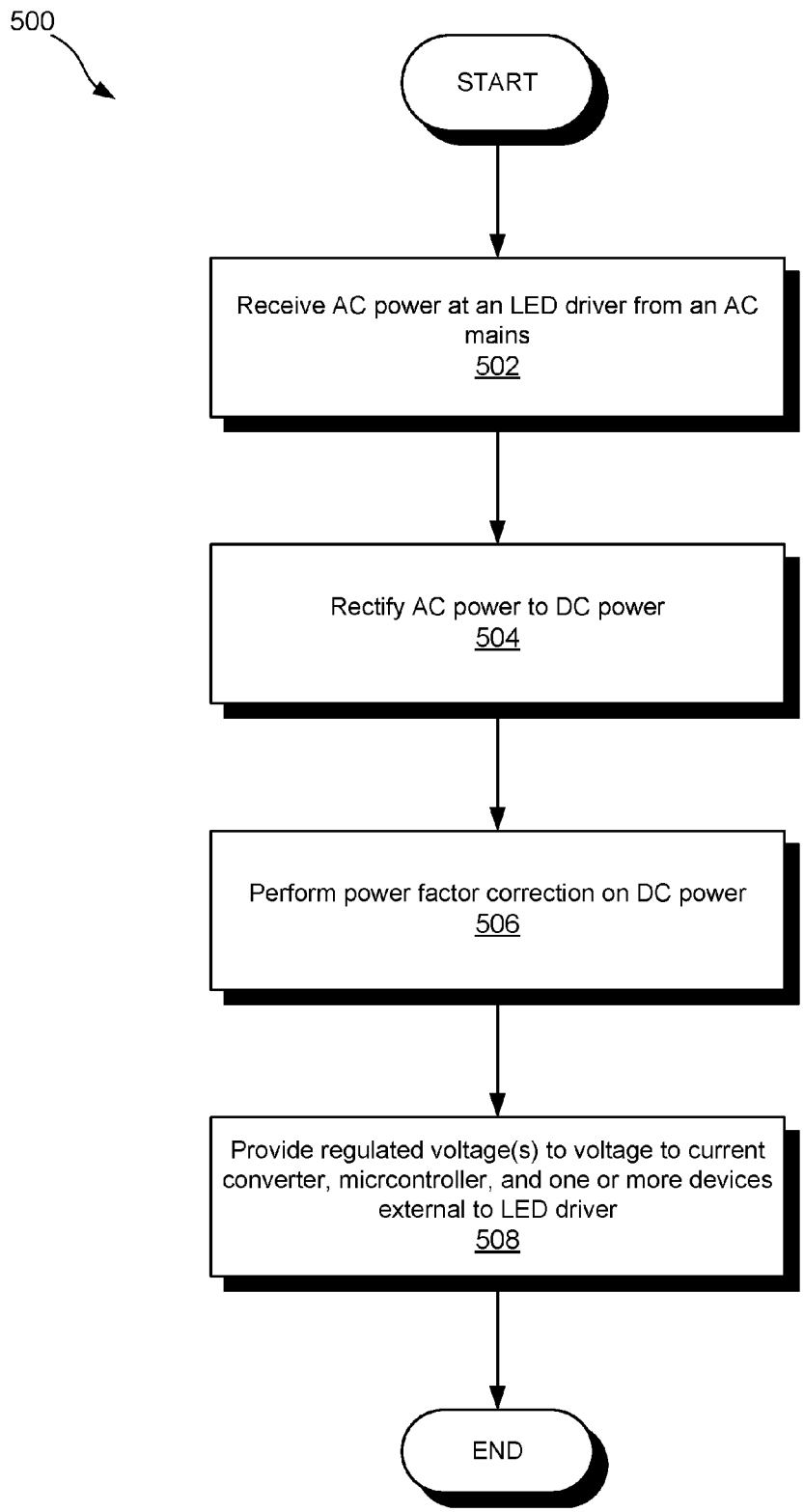
FIG. 5 illustrates a method of operating a plurality of devices, such as LED drivers, using a single rectification circuit, a single power factor correction circuit, and a single connection to an AC mains.

FIG. 5 illustrates a method of operating a plurality of devices, such as LED drivers, using a single rectification circuit, a single power factor correction circuit, and a single connection to an AC mains. The method includes receiving AC power at an LED driver from an AC mains (Block 502), rectifying the AC power to DC power (Block 504), and performing power factor correction on the DC power (Block 506). The method 500 can then provide a regulated voltage from the power factor correction to a voltage to current converter, a microcontroller, and one or more devices external to the LED driver (Block 508). Alternatively, Block 508 can include providing multiple regulated voltages from the power factor correction to a voltage to current converter, a microcontroller, and one or more devices external to the LED driver. Those of skill in the art will appreciate that rectification can occur before or after the step-down or downconversion aspect of power factor correction.

Power Factor Correction Circuit Adjustable Output Method

Known LED drivers typically include a power factor correction circuit with a controllable power output as seen in FIG. 7a (right). Power factor is often dealt with during step down conversion, where a duty cycle of a switch in the step down circuitry corresponds to the step down ratio. However, since input voltage to an LED driver is fixed at 120V (in the US) and 220V (in the EU and UK), when decreased output from the power factor correction circuit is desired, for instance when dimming is requested, the input current to the power factor correction circuit drops as seen in FIG. 7a (left). Such adjustment of the power output is typically achieved via a reduced duty cycle of the switch such as switch 618 in FIG. 6 or other switching means (e.g., switch mode power supply). As the switch's duty cycle is decreased, the average power out decreases (e.g., the decrease of $P_1$ to $P_2$ in FIG. 7a (right)). A reduction in the duty cycle of a switching means can be seen in FIG. 8a (left) and the resulting reduction in average output power can be seen in FIG. 8a (right). This decrease also results in a lower current draw from the AC mains as seen in FIG. 7a (left). Unfortunately, as input current decreases, the power factor correction circuit's (e.g., 602 in FIG. 6) ability to maintain a desired total harmonic distortion (THD) and power factor decreases (typically low THD and high power factor are desired). Thus, there is a need for an LED driver that can maintain a desired THD and power factor when the LED driver reduces current to the LED light.

As noted above, FIG. 7a (left) illustrates a plot of input current versus time for two output states of an LED driver according to traditional methods of reducing output power from a PFC circuit. Dashed lines show a first state (limited or no dimming), and solid lines show a second state (greater dimming than the first state). FIG. 7a (right) illustrates a plot of output power from a power factor correction circuit versus time for the two different power states, where the power factor correction circuit receives a rectified version of the input current shown in FIG. 7a (left). One sees that the traditional PFC circuit sees decreased input current when output power is reduced.

In contrast, FIG. 7b (left) illustrates a plot of input current versus time for two power states of a new LED driver according to an embodiment of this disclosure. FIG. 7b (right) illustrates a plot of output power from a power factor correction circuit versus time for the two power states, where the power factor correction circuit receives a rectified version of the input current shown in FIG. 7b (left). With the new LED driver and method of operation, power is reduced (e.g., LED output is dimmed) by turning a switching means (e.g., a switch mode power supply) within the power factor correction circuit (e.g., 618) off for one or more half cycles of the input, causing the output power to fall from $P_1$ to $P_3$, while maintaining an amplitude of the input current. Power in the PFC circuit is cut every other half cycle, leading to a reduced average power, $P_3$, yet maintaining the instantaneous input current during half cycles where power is transmitted. Such a power reduction can be carried out via a switch mode power supply or switching means within the PFC circuit. Consequently, the power factor correction circuit is able to reduce power out while also accurately producing a desired THD and power factor since there is no reduction in input current when output power is reduced. FIG. 7b (right) illustrates an example where the PFC circuit cuts power every other half cycle, but in other instances, other multiples of half cycles may be cut in order to achieve different levels of power out reduction (e.g., two out of every three cycles, or every third cycle, etc.).

Figure 6:
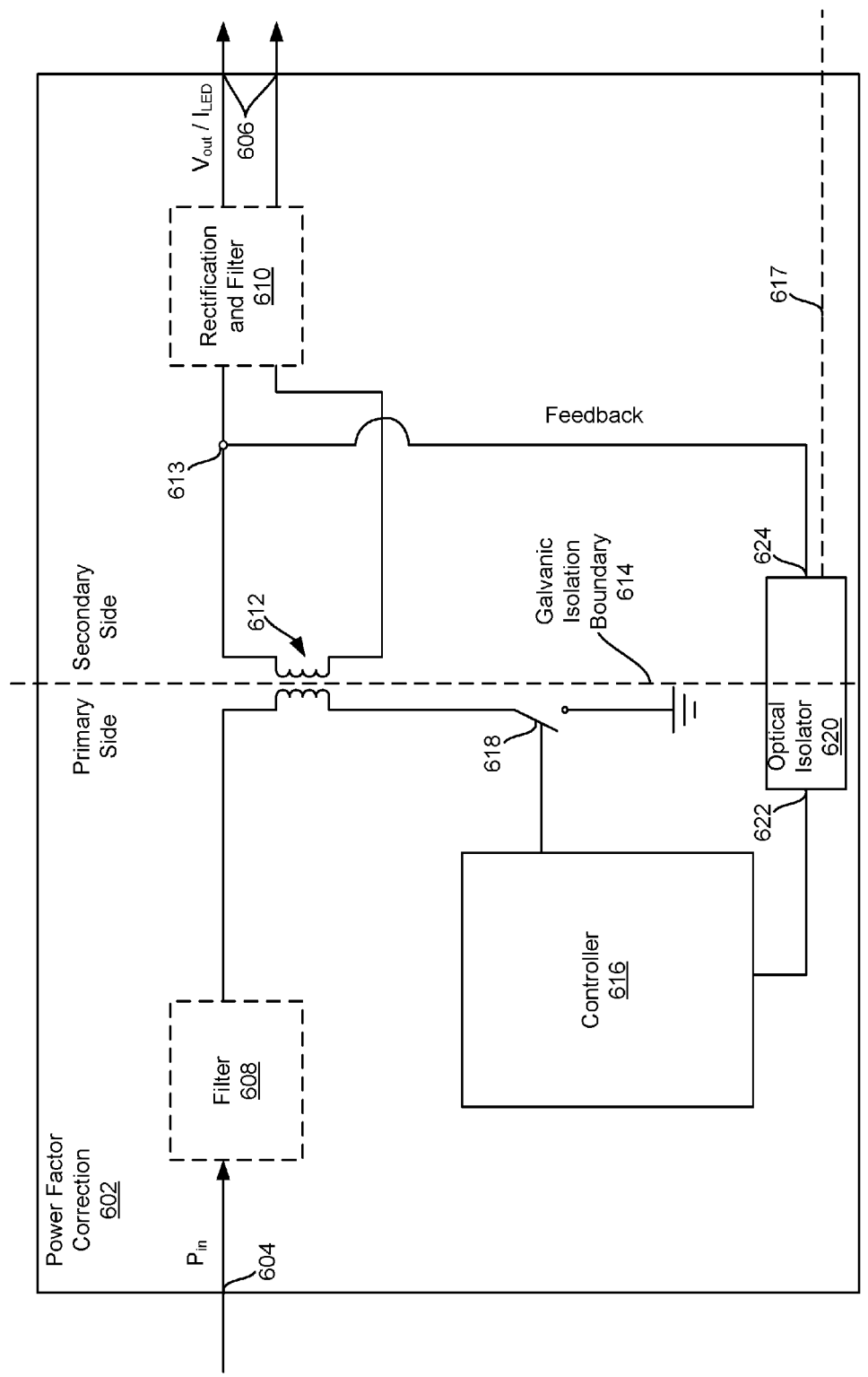
FIG. 6 illustrates a power factor correction circuit that can correspond to the plots shown in FIGS. 7b and 8b.
Figure 10:
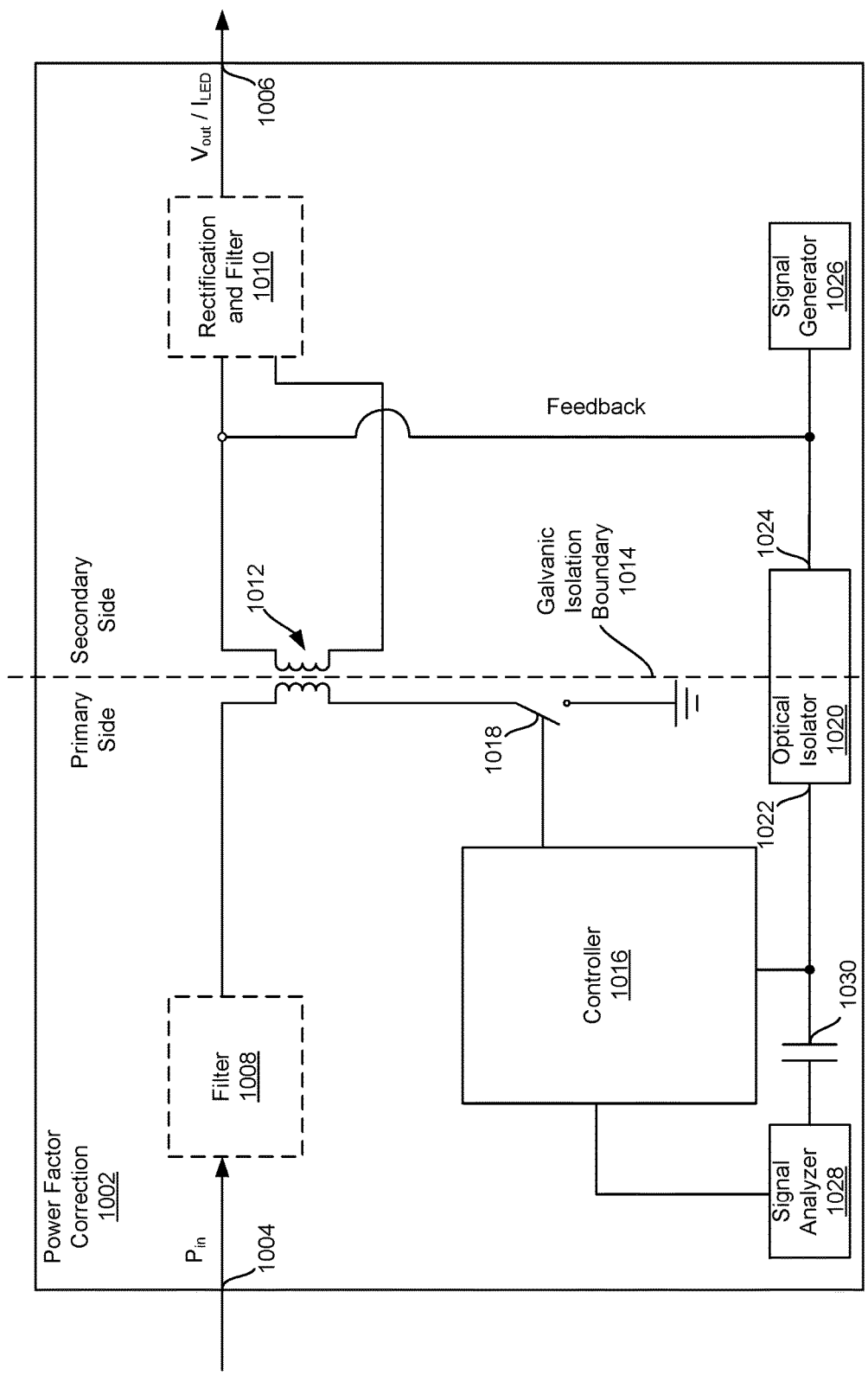
FIG. 10 illustrates a power factor correction circuit according to one embodiment of this disclosure.
Figure 12A:
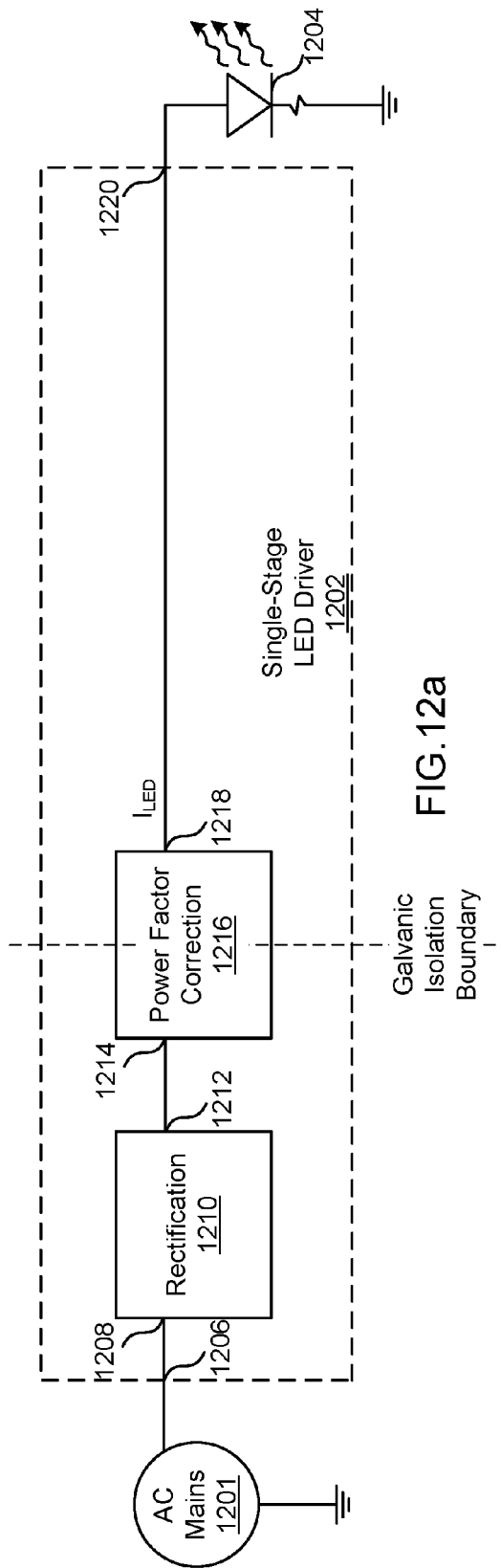
FIG. 12a illustrates a single-stage LED driver incorporating the power factor correction circuits discussed earlier the application.
Figure 12B:
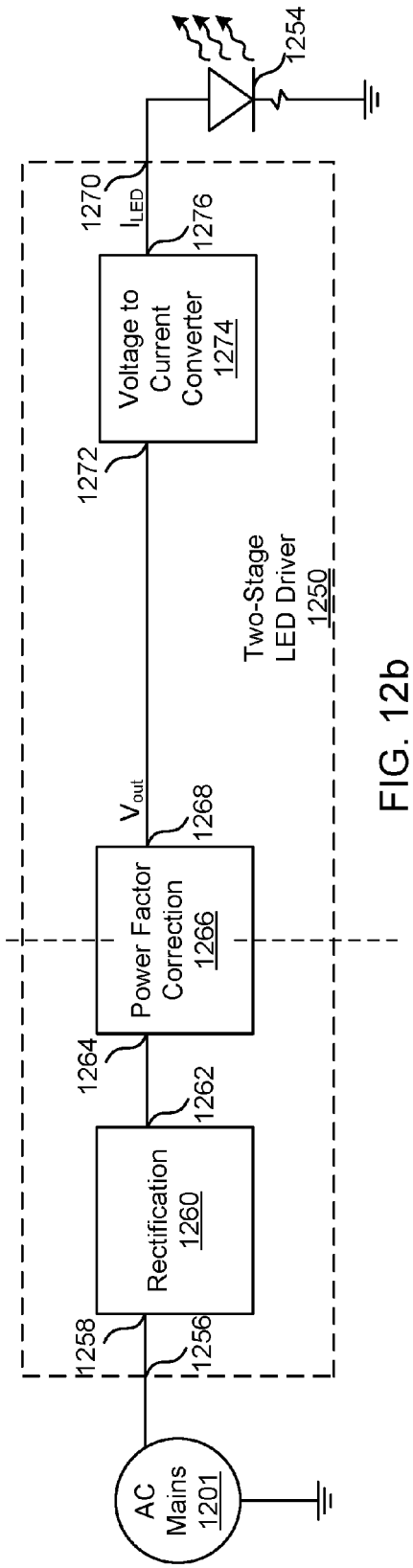
FIG. 12b illustrates a dual-stage LED driver incorporating the power factor correction circuits discussed earlier the application.
Figure 13A:
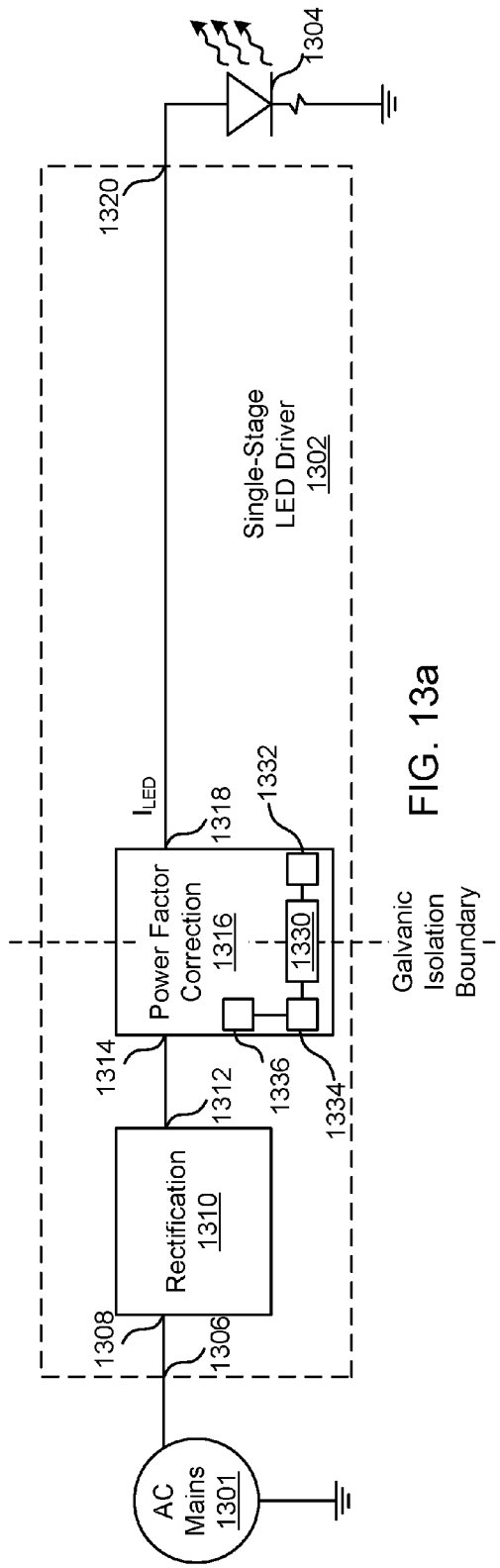
FIG. 13a illustrates another view of a single-stage LED driver.
Figure 13B:
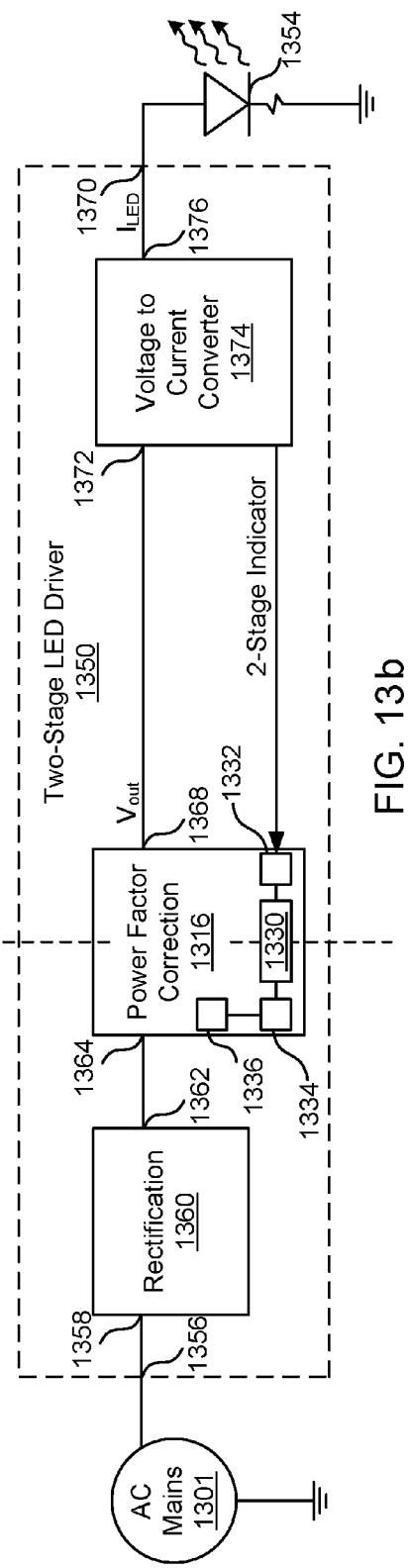
FIG. 13b illustrates another view of a dual-stage LED driver.

The output power shown in FIG. 7b right can be measured, for instance, at an output of any of the following: 308 in FIG. 3; power factor correction in FIG. 4; 602 in FIG. 6; 1002 in FIG. 10; 1216 in FIG. 12a; 1266 in FIG. 12b; 1316 in FIG. 13a; and 1317 in FIG. 13b. Input current can be measured, for instance at input 604 in FIG. 6, or anywhere between an AC mains and the optional filter 608, or between the AC mains and the primary side of the transformer circuit 612 if the optional filter 608 is not implemented on the primary side.

Figure 8A:
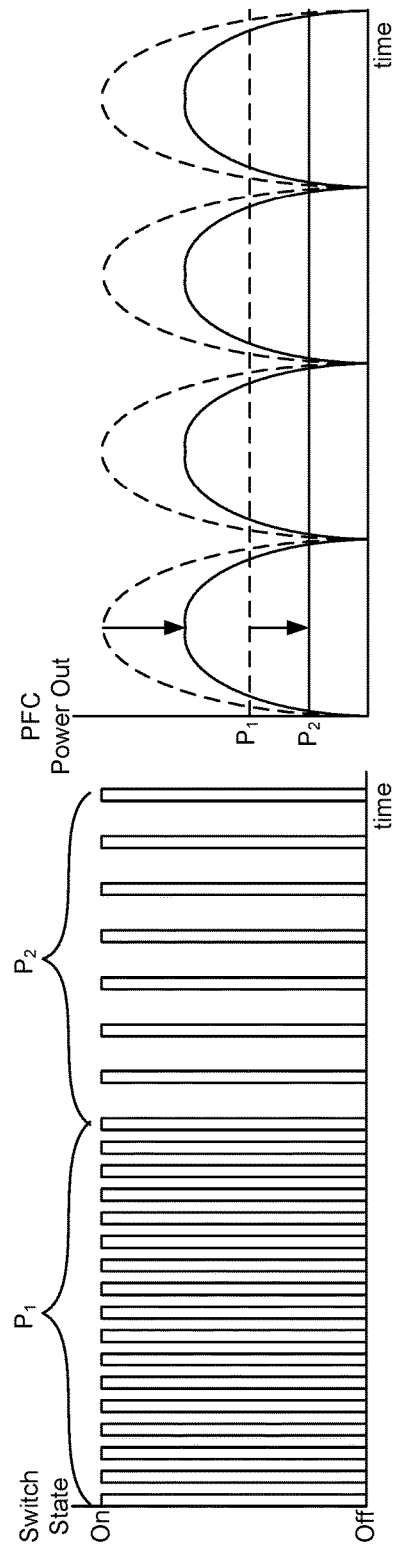
Figure 8B:
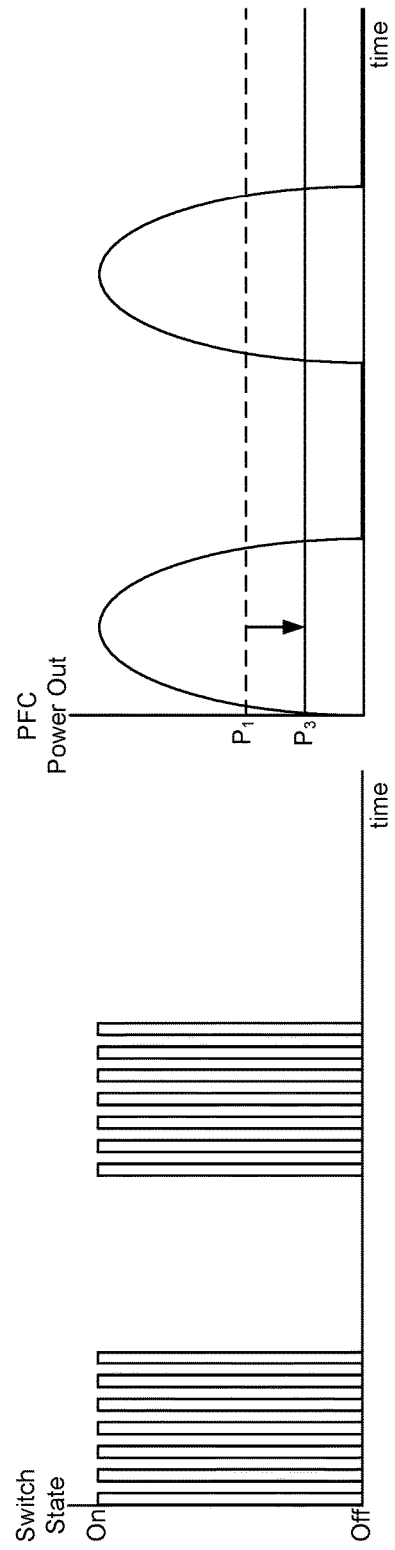
FIG. 8b illustrates switching states and power outputs corresponding to FIG. 7b.

FIGS. 8a and 8b illustrate switching states (left) that achieve the input currents of FIGS. 7a and 7b (left) and the output powers shown in FIGS. 7a and 7b (right) and FIGS. 8a and 8b (right). It should be noted that the right hand plots in both FIGS. 7 and 8 are identical. FIG. 8a shows how the duty cycle of a switch within a traditional power factor correction stage can be reduced in order to cause a decrease in the average output power (e.g., from $P_1$ to $P_2$). FIG. 8b shows the switching cycle according to the new LED driver of this disclosure. Instead of reducing the duty cycle of a switching means within the PFC circuit, the duty cycle can be left the same, but the entire switching means, or PFC circuit, depending on implementation, can be shut off on select half cycles of the incoming AC waveform. In the illustrated embodiment, the switching means, or the PFC circuit, is turned off every half cycle. In this way the instantaneous current drawn remains the same during periods when the switch or PFC circuit is on, yet the average output power is reduced from $P_1$ to $P_3$. If a larger output power reduction is desired, then the switching means or PFC circuit can be turned off for a greater percentage of half cycles. For instance, two out of every three half cycles, or five out of every six half cycles, etc. If a smaller reduction in output power is desired, then the switching means or PFC circuit can be turned off for a lesser percentage of half cycles. For instance, one out of every three half cycles, or one out of every six half cycles, etc.

The initial duty cycle of the switch or switching means, before a reduction in output power, can be selected to downconvert input power to output power. For instance, downconverting, 120V power to 24V. While traditional PFC circuits adjust the duty cycle further to adjust for adjustments of the power output (e.g., dimming), this disclosure maintains this initial duty cycle, but turns the switch or switching means off for entire half cycles in order to achieve the same adjustments in power output, but without reductions in instantaneous input current.

Although FIGS. 7 and 8 addressed a situation where power is rectified before being downconverted, these charts apply equally well to situations where power is downconverted before being rectified.

FIG. 6 illustrates a power factor correction circuit that can correspond to the plots shown in FIGS. 7b and 8b. The power factor correction (PFC) circuit 602 shows a detailed view of the PFC circuits illustrated in FIGS. 3 and 4. The PFC circuit 602 includes an input 604 for receiving a rectified power signal from an optional rectifier circuit (not shown), and includes an output 606 for providing a regulated voltage, $V_{out}$, or regulated current, $I_{LED}$. These outputs can be used to indirectly or directly, respectively, drive one or more LEDs. However, in alternative embodiments, the input 604 can received non-rectified power, which is then downconverted, and rectified after downconversion, for instance via a rectifier coupled to the output 606. The PFC circuit 602 can optionally include a filter 608 and an optional rectification and filter circuit 610. Either 602 or 608 can be implemented. A transformer circuit 612 is arranged between the optional filter 608 and the optional rectification and filter circuit 610 or between the input 604 and the output 606. The transformer circuit 612 provides galvanic isolation between the primary side (e.g., AC mains side) and the secondary side (e.g., LED light side). Galvanic isolation is a principle of isolating functional sections of electrical systems to prevent current flow; in other words, no direct conduction path is permitted from the primary to the secondary side. Thus, the galvanic isolation boundary 614 represents a boundary across which DC electrical current is unable to cross. The galvanic isolation boundary 614 can include the transformer circuit 612, a gap between PCB boards, an air gap, and/or other mechanisms known in the art to achieve galvanic isolation. One can see that the primary side of the transformer circuit 612 is on the left side of the galvanic isolation boundary 614, or the "hot" side of the boundary 614, and the secondary side of the transformer circuit 612 is on the right side of the boundary 614, or the side that is considered relatively safe to human contact.

The PFC 602 can also include a controller circuit 616 arranged on and coupled to the primary side. The controller 616 can be coupled to a switch 618 or switching means that controls whether or not the primary side of the transformer circuit 612 is coupled to ground or not. The controller 616 may react to feedback from the secondary side of the transformer circuit 612 (e.g., a voltage at an output of the transformer circuit 612). As noted above, electrical connections cannot cross the galvanic isolation boundary 614, so to provide feedback to the controller 616 from the secondary side of the transformer circuit 612, an optical isolator 620 is implemented. The optical isolator 620 is an opto-electronic device having two electrical input/output interfaces 622, 624. A first of these 622 can be coupled to the controller 616, and a second 624 can be coupled to an output of the secondary side of the transformer circuit 612. Between these two interfaces 622, 624 is an optical relay and an optical-to-electrical converter for each interface 622, 624. The optical relay allows data to be optically transmitted across the galvanic isolation boundary 614 without a physical electrical connection. Sometimes an optical isolator 620 is a unidirectional device, and in such cases, the optical isolator 620 can be configured to only pass data toward the hot side of the galvanic isolation boundary 614 (e.g., from interface 624 to interface 622).

In some embodiments, the controller 616 can include an optional data or communication channel 617 to another controller (not shown). For instance, the another controller could be configured to control charging and discharging of an energy storage device that is charged from an output of the PFC circuit 602. The another controller could also be configured to control operation of a voltage to current converter that converts the output voltage, $V_{out}$, of the PFC circuit 602, to a regulated LED current used to drive one or more LEDs. This another controller, can be referred to as a master controller, since it can be configured to control other sub systems or other controllers within an LED driver. The master controller can be part of an LED driver that includes the PFC circuit 602, or can be coupled to but external to the LED driver.

While the switch 618 is typically used as part of a switch-mode power supply and its duty cycle determines an output power from the secondary side of the transformer circuit 612, here the switch 618 can be controlled so as to effect a reduced output of the LED driver without decreasing the duty cycle and thereby avoiding a reduction in instantaneous input current at input 604. In particular, to change an average output power at output 606, the controller 616 can maintain a constant duty cycle of the switch 618, but leave the switch 618 open during select half cycles of input current. As a result, instantaneous input current at input 604 remains the same regardless of output power, and average output power at output 606 can be reduced. Via this switching method, the PFC circuit 602 can operate as effectively as when no power reduction (e.g., dimming) is taking place (i.e., where no half cycles are chopped or switched out of the power output).

Figure 14:
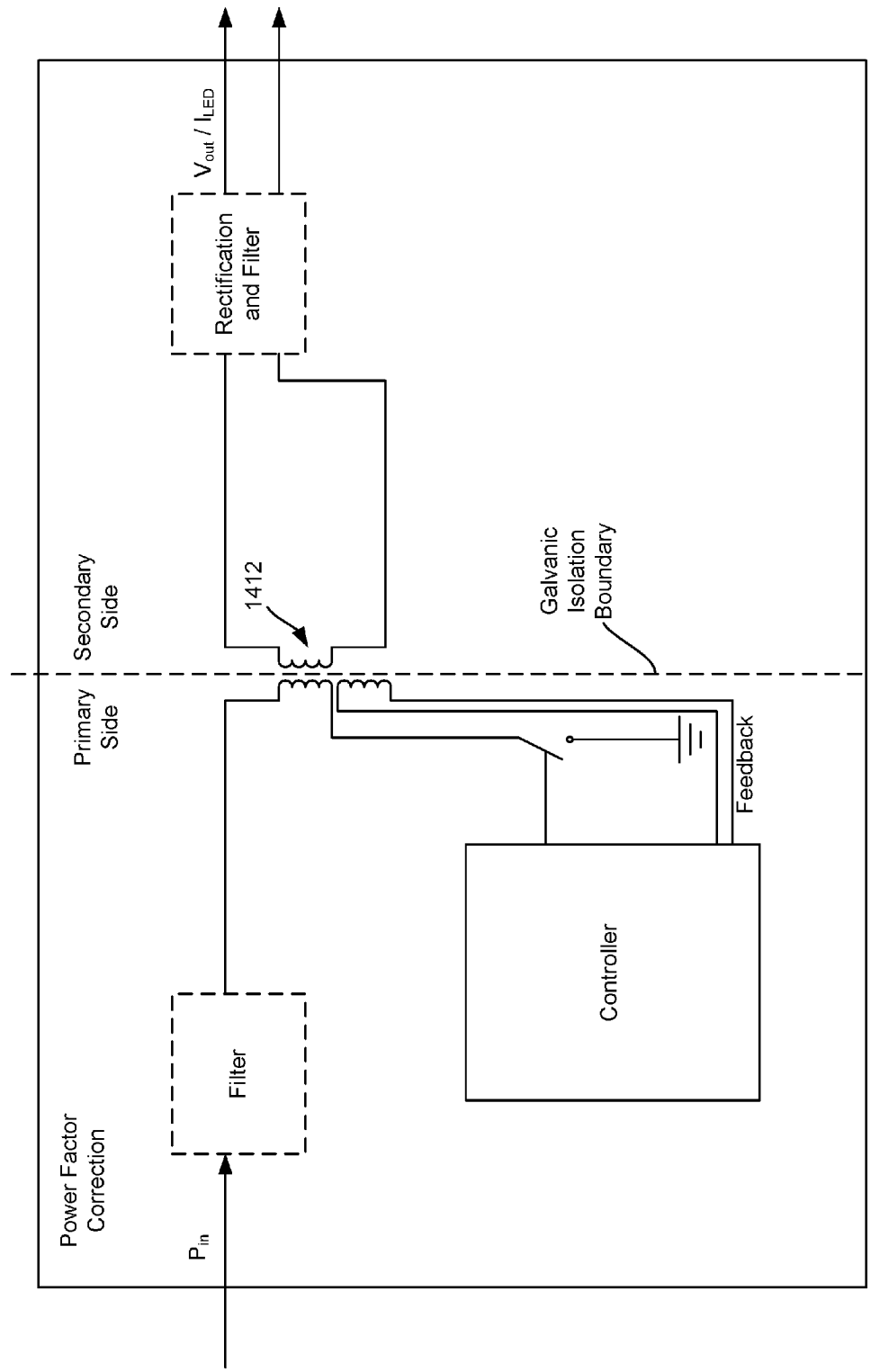
FIG. 14 illustrates another embodiment of a power factor correction circuit where feedback is provided from the primary side.
Figure 15:
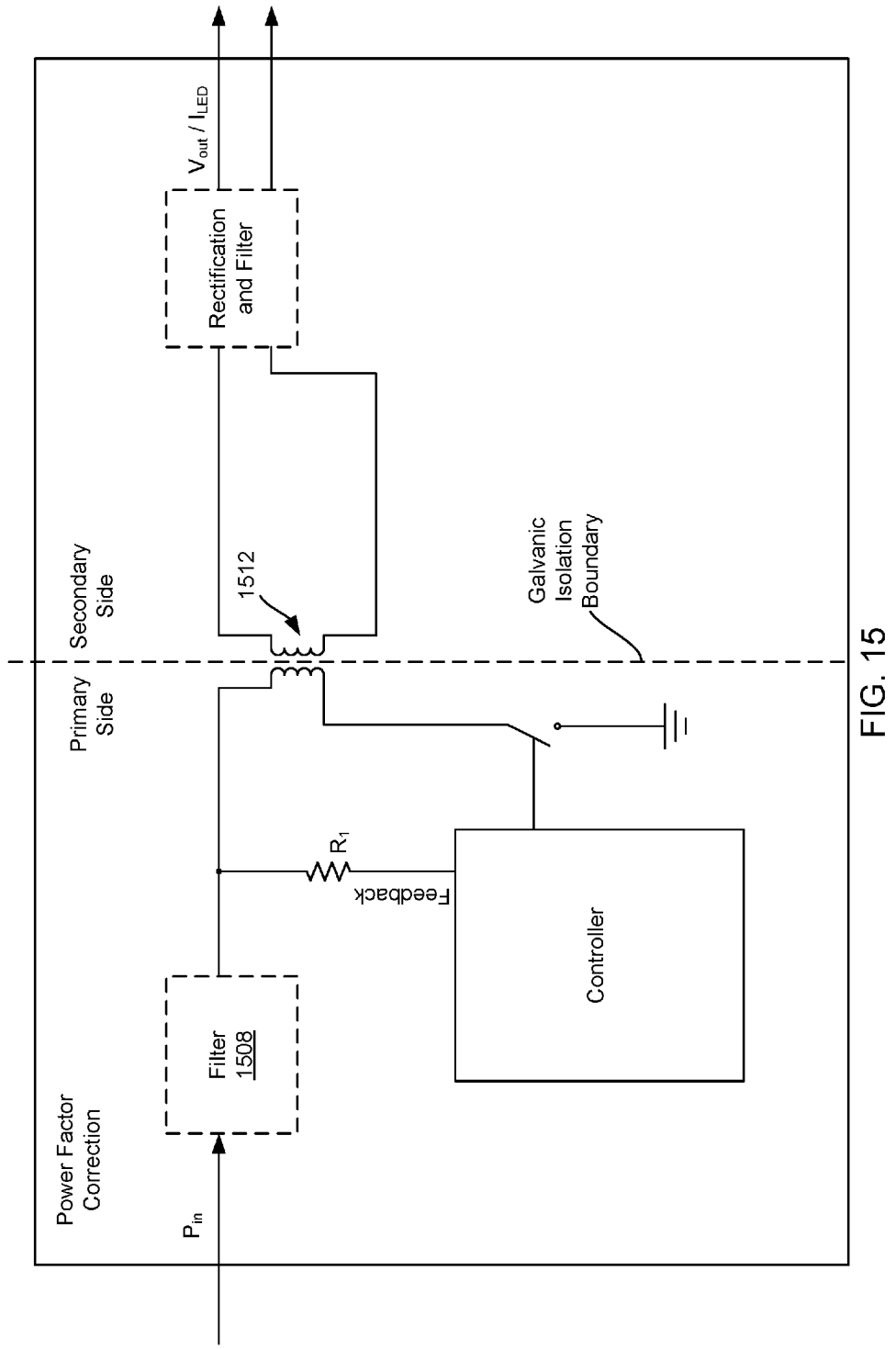
FIG. 15 illustrates another embodiment of a power factor correction circuit where feedback is provided from the primary side.

Additionally, power savings can be achieve where the controller 616 only switches the switch 618 at zero crossings of the power. Power can be measured as power, voltage, current, or a combination of these at the input 604, input of the transformer circuit 612, at the transformer circuit 612, at an output 613 of the transformer circuit 612, or at the output 606. The illustrated embodiment, shows this feedback coming from an output 613 of the transformer circuit 612, but in other embodiments, the feedback used to identify zero crossings of the power can use any of the above-mentioned feedback sources. For instance, FIG. 14 illustrates one non-limiting example where the feedback is provided from the primary side of a transformer circuit 1412. In particular, feedback can be provided via a second coil of the primary side of the transformer circuit 1412. In another example, FIG. 15 shows the feedback being provided from between the optional filter 1508 and the transformer circuit 1512 via a resistive element $R_1$.

The switch 618 can be implemented by a variety of devices or circuits, such as a physical relay or a transistor to name two non-limiting examples. In some embodiments, more than one physical switch can be used, for instance, a MOSFET network may be implemented as the switch 618.

One of skill in the art will recognize that the PFC circuit 602 illustrates a functional diagram only rather than a circuit diagram, and thus other operative circuit configurations can be used to implement the same functionality without departing from the scope of the disclosure. In other words, any PFC circuit topology can utilize this aspect of the disclosure. For instance, the switch 618 can be replaced with two or more switches. As another example, the transformer circuit 612 can be replaced by other devices that can transfer power while providing galvanic isolation.

Figure 9:
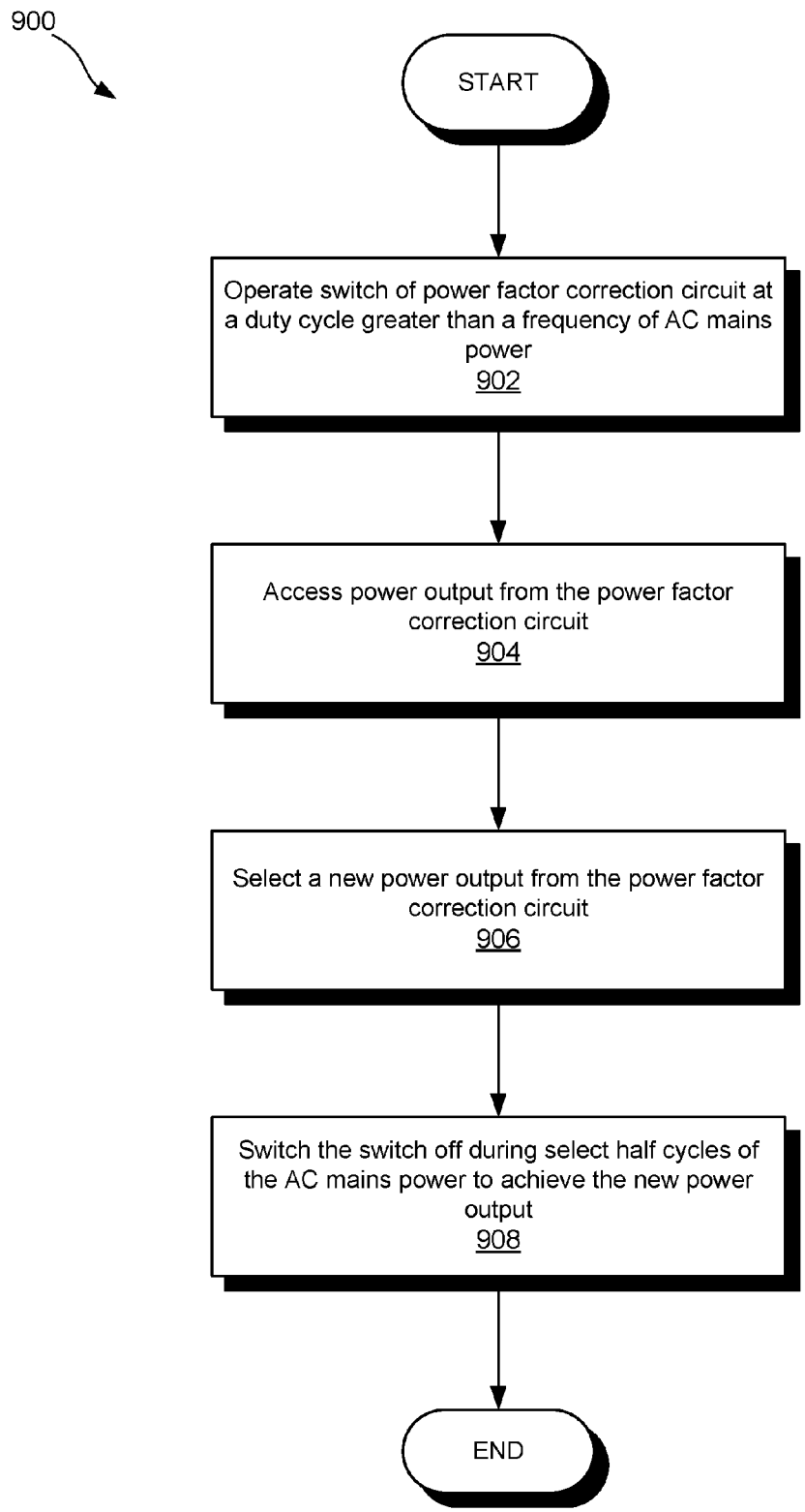
FIG. 9 illustrates a method of operating a power factor correction circuit to provide various levels of power output while maintaining a constant current draw from an AC mains.

FIG. 9 illustrates a method of operating a power factor correction circuit so as to provide various levels of power output while maintaining a constant current draw from an AC mains. The method 900 includes operating a switch of a power factor correction circuit at a duty cycle greater than a frequency of AC mains power (Block 902). This duty cycle is selected to achieve a desired downconversion of the AC mains power. Said another way, the duty cycle is selected to achieve a desired regulated voltage output that is lower than the AC mains voltage. The method 900 can also include accessing a power output from the power factor correction circuit (Block 904) and selecting a new power output for the power factor correction circuit (Block 906). Given the new power output, the method 900 switches the switch off during select half cycles of the AC mains power to achieve the new power output (Block 908). For instance, in order to cut the power output in half, every half cycle may see the switch turned off completely for a full half cycle of each period.

Additionally, switching of the switch may be aligned with zero crossings of the power, voltage, or current, measured on the primary side, the secondary side, or within a transformer circuit of the PFC circuit.

Piggybacked Signal Through Optical Isolator of Power Factor Correction Circuit

As noted above, power factor correction circuits often require galvanic isolation to protect users from electrocution. In other words, the LED light can be electrically isolated from the 120V, or "hot" side of the LED driver by a means such as a transformer (where power passes from one side of the transformer to the other via an electric field rather than via a physical conductive connection). Some LED drivers include an optical isolator that spans the galvanic isolation and allows feedback from the output or secondary side of the transformer to be passed back to a controller on the primary side of the transformer. This optical isolator often carries an analogue signal centered around 60 Hz across the galvanic isolation boundary that corresponds to the AC frequency of the AC mains power. Additional data cannot cross the galvanic isolation since any electrical data connection requires a physical coupling across the boundary, which would sever the galvanic isolation. However, there may be additional data to be passed across the galvanic isolation boundary.

One solution is to add one or more additional optical isolators. However, since these optical isolators each include circuits for passing optical signals between the two sides of the galvanic isolation, they can be bulky and costly, and the use of additional optical isolators may not be feasible or commercially viable.

To address these limitations in the art, this disclosure describes an embodiment of a PFC circuit including an optical isolator and further including a signal generator on the secondary side of the galvanic isolation boundary and a signal analyzer on the primary side of the galvanic isolation boundary (see FIG. 10). The signal generator 1026 can piggyback the 60 Hz feedback signal already traveling across the optical isolator 1020, for instance with a 120 Hz signal, or another higher frequency signal that is easily filtered or separated from the 60 Hz signal, and in this way additional data can be passed across the galvanic isolation boundary 1014 without the addition of one or more additional optical isolators. The signal analyzer 1028 can then look at the signal coming through the optical isolator 1020 and filter out the 60 Hz signal, thereby leaving the 120 Hz signal. This data can, for instance, be provided to the controller 1016 to provide further information or feedback for use in controlling the power factor correction circuit 1002.

In some embodiments, a capacitor 1030, capacitive device, or other low frequency filtering circuit can be added to an input of the signal analyzer in order to filter out the 60 Hz signal.

Figure 11:
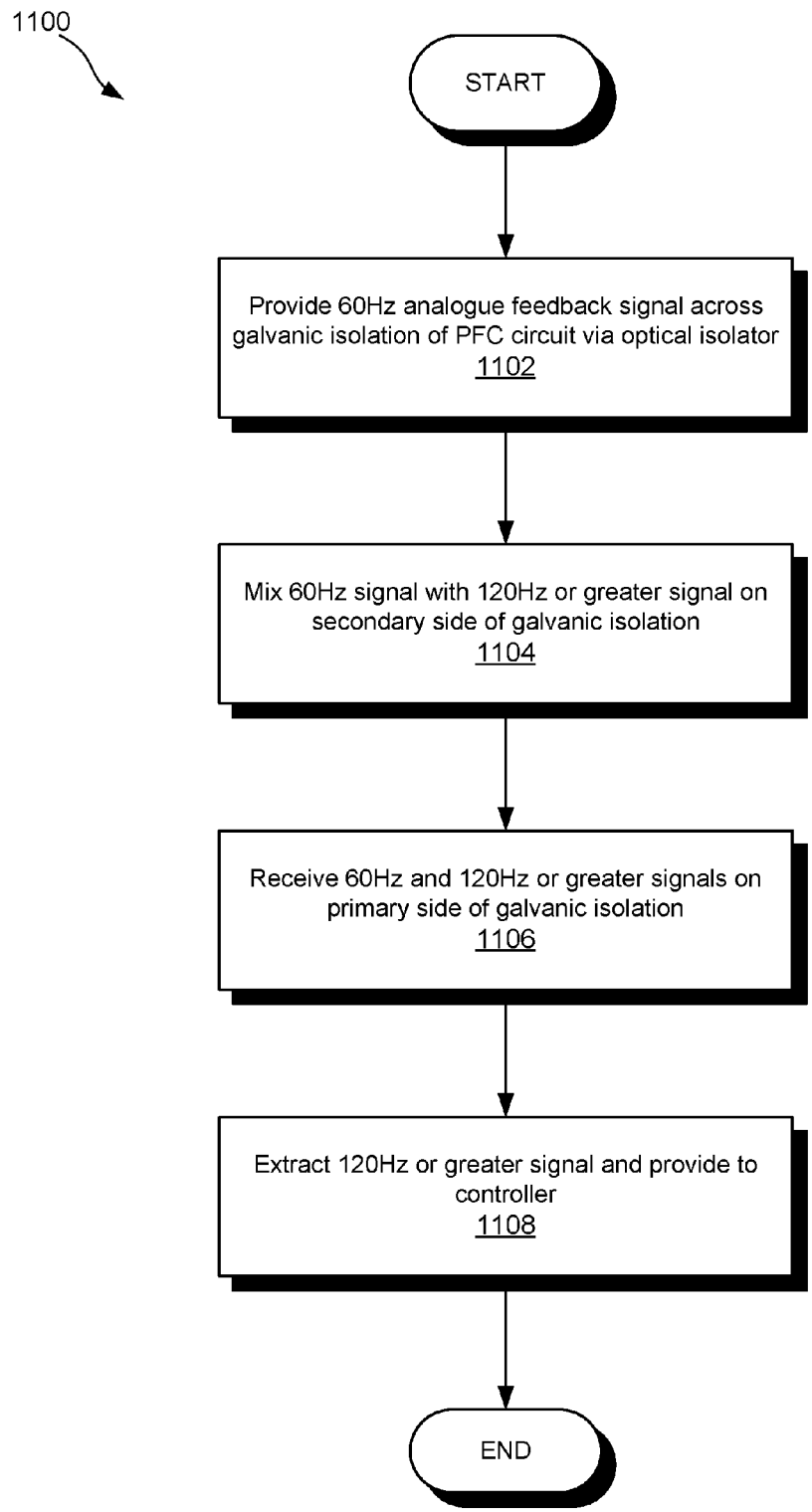
FIG. 11 illustrates a method for operating a power factor correction circuit passing signals across a galvanic isolation boundary by piggybacking a 60 Hz feedback signal passing through an optical isolator that spans the galvanic isolation boundary.

FIG. 11 illustrates a method for operating a power factor correction circuit passing signals across a galvanic isolation boundary by piggybacking a 60 Hz feedback signal passing through an optical isolator that spans the galvanic isolation boundary. The method 1100 can include providing a 60 Hz analogue feedback signal across a galvanic isolation of a power factor correction (PFC) circuit via an optical isolator (1102). The method 1100 can further include mixing the 60 Hz signal with a 120 Hz or greater signal on the secondary side of the galvanic isolation (Block 1104). The method 1100 can further include receiving both signals on the primary side of the galvanic isolation (Block 1106), and extracting the 120 Hz or greater signal and providing this extracted signal to a controller on the primary side of the galvanic isolation (Block 1108). The 60 Hz signal can also be extracted and provided separately to the controller.

In other embodiments, the 60 Hz and 120 Hz or greater signals can be replaced by other frequencies.

Modular Power Factor Correction Circuit Configured for Use in Single-Stage and Two-Stage Led Drivers FIGS. 12*a* and 12*b* illustrate single-stage and two-stage LED drivers incorporating the PFC circuits discussed above. The single-stage LED driver 1202 is coupled between an AC mains 1201 and one or more LED lights 1204. The AC mains 1201 couples to an input 1206 of the single-state LED driver 1202, and this input 1206 is coupled to an input 1208 of a rectification circuit 1210. The rectification circuit 1210 has an output 1212 coupled to an input 1214 of a PFC circuit 1216. The PFC circuit 1216 has an output 1218 that provides a regulated LED current, $I_{LED}$. The PFC circuit's 1216 output 1218 is coupled to an output 1220 of the single-stage LED driver 1202, which is coupled to the one or more LED lights 1204 and provides the regulated LED current, $I_{LED}$, to the one or more LED lights 1204.

In the two-stage LED driver 1250 (FIG. 12b), the same components exist, but the PFC output 1268 provides a regulated voltage, $V_{out}$, rather than a regulated LED current, and this output 1268 is coupled to an input 1272 of a voltage to current converter 1274. The voltage to current converter 1274 has an output 1276 that provides a regulated LED current, $I_{LED}$, that is provided to an output 1270 of the two-stage LED driver 1250 and to one or more LED lights 1254.

Because the PFC circuits 1216, 1266 have different outputs depending on whether the PFC circuit is part of a single-stage or two-stage LED driver, a different PFC circuit is needed for the two different types of LED drivers 1202, 1250. However, costs could be reduced if the same PFC circuit could be used for both single and dual stage LED drivers 1202, 1250. In other words, for companies producing both single-stage and two-stage products, there is a need for a single PFC circuit that can be implemented in either product.

This disclosure describes single and dual-stage LED drivers where a single PFC circuit can be interchangeably used in either type of LED driver. FIGS. 13a and 13b illustrate embodiments of such a dual purpose PFC circuit.

As with the LED drivers of FIGS. 12a and 12b, the single-stage LED driver 1302 is coupled between an AC mains 1301 and one or more LED lights 1304. Again, the single-stage LED driver 1302 includes a rectification circuit 1310 and a PFC circuit 1316, but in this case the PFC circuit 1316 of the single-stage LED driver is the same as the PFC circuit 1316 of the two-stage LED driver 1350.

Further, the PFC circuit 1316 has two modes: a voltage mode for outputting regulated voltage, $V_{out}$, and a current mode for outputting regulated LED current, $I_{LED}$. The current mode is designed for use in a single-stage LED driver 1302 and the voltage mode is designed for use in a two-stage LED driver 1304. A controller 1336 in the PFC circuit 1316 determines which output is desired, and directs the PFC circuit 1316 to change to the corresponding mode so that its output matches the LED driver type that it is installed in.

To determine the type of LED driver, the controller 1336 acquires data indicating some defining characteristic of the type of LED driver (e.g., whether single or dual-stage). Everything on the primary side of the galvanic isolation boundary is identical between the two drivers, and thus no indicators of driver type are available on the primary side. However, the secondary side includes components and feedback that can indicate the driver type. Yet, as noted earlier, it is not possible to create a physical electrical connection across this boundary, so there is no known solution for conveying data indicating the driver type to the controller 1336 from the secondary side.

Fortunately, and as discussed above, a signal with a frequency that does not interfere with the 60 Hz feedback signal on the optical isolator 1330 can piggyback the 60 Hz feedback signal. With the use of a signal generator 1332 on the secondary side of the optical isolator 1330 and a signal analyzer 1334 on the primary side, a piggybacked signal can convey to the controller 1336 whether the PFC circuit 1316 output is coupled to a voltage to current converter 1374 or directly to the one or more LED lights 1304; in other words, whether the LED driver is single-stage or dual-stage and hence whether the PFC circuit 1316 should be put into the current or voltage mode.

To generate the piggybacked signal, the signal generator 1352 can receive an input, or "dual-stage indicator", from the voltage to current converter 1374 when such a converter exists. When this occurs, the signal generator 1352 can send a piggyback signal through the optical isolator 1350 of the PFC circuit 1316, where this piggyback signal is added to or combined with the existing 60 Hz feedback signal already passing through the optical isolator 1350. A signal analyzer 1334 on the primary side of the galvanic isolation boundary can receive this piggyback signal and either inform the controller 1356 that the LED driver 1350 includes the voltage to current converter 1374, and allow the controller 1316 to conclude that the LED driver is dual-stage, or make the conclusion itself and inform the controller 1356 that the LED driver 1350 is a dual-stage driver. Either way, the controller 1356 can then instruct the PFC circuit 1316 to output a regulated voltage, $V_{out}$.

If a voltage to current converter is not present, then the signal generator 1352 either does not send a piggyback signal or sends a different piggyback signal indicating that no voltage to current converter is present. If the piggyback signal is passed through the optical isolator 1350, then the signal analyzer 1334 receives and extracts this piggyback signal and tells the controller 1356 that a voltage to current converter is not present. The controller 1356 can then instruct the PFC circuit 1316 to provide a regulated current, $I_{LED}$. Alternatively, the signal analyzer 1334 can extract the piggyback signal and pass it along to the controller 1356, which can then analyze the extracted signal and conclude that a voltage to current converter is not present.

As seen, piggybacking the 60 Hz signal of the optical isolator 1330 provides a way for the LED driver 1302, 1350 to inform the controller 1356 of the PFC circuit 1316, what type of LED driver the PFC circuit 1316 is installed in, and thereby allows a single PFC circuit 1316 to be used in both types of LED drivers 1302, 1350. Other LED drivers cannot achieve this modularity because they do not enable a simple cost-effective way to pass data over the galvanic isolation boundary.

In other embodiments, a master controller on the secondary side of the galvanic isolation boundary, or separate from the LED drivers 1302, 1350 can identify the type of driver and pass this info or an instruction to the PFC circuit 1316, which can then select an output mode (e.g., voltage or current regulating) based on this information or the instruction from the master controller. Further details of embodiments where a master controller is implemented can be seen in U.S. Ser. No. 15/453,772, which is hereby incorporated by reference in its entirety.

While this disclosure has described an LED of either the single or dual-stage variety, other variations can include active and passive methods for power factor correction. Passive PFC solutions typically consist of passive input filters and offer some cost benefits, but since passive PFC optimizes for a specific input voltage and current condition, when those conditions change, the power factor also decreases. In the case of dimmable luminaires, passive PFC may be not acceptable as the power factor can vary broadly across the full operating brightness range of the bulb. Sometimes active PFC is desired to adequately maintain high PFC across load and line conditions.

Figure 16:
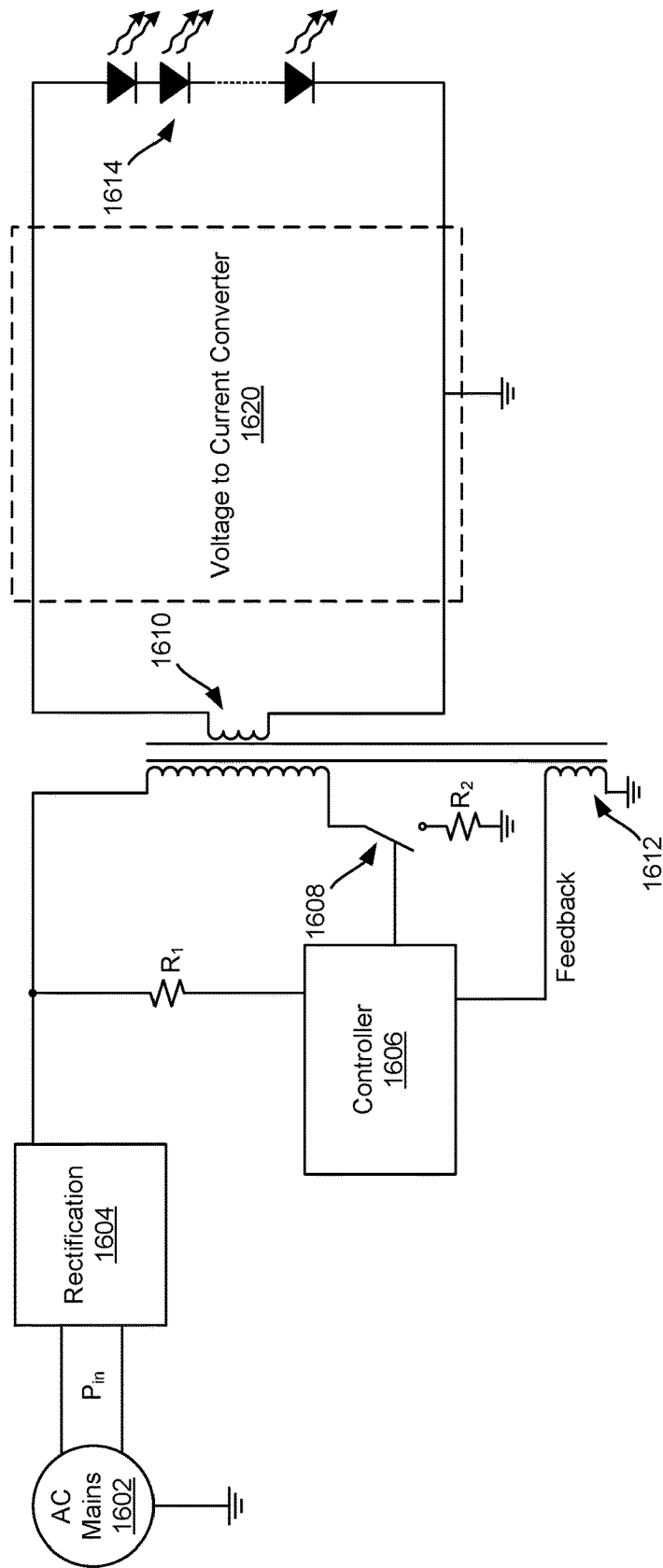
FIG. 16 shows an LED driver receiving AC mains power, $P_{in}$, from an AC mains and providing regulated LED current to one or more LEDs.
Figure 17:
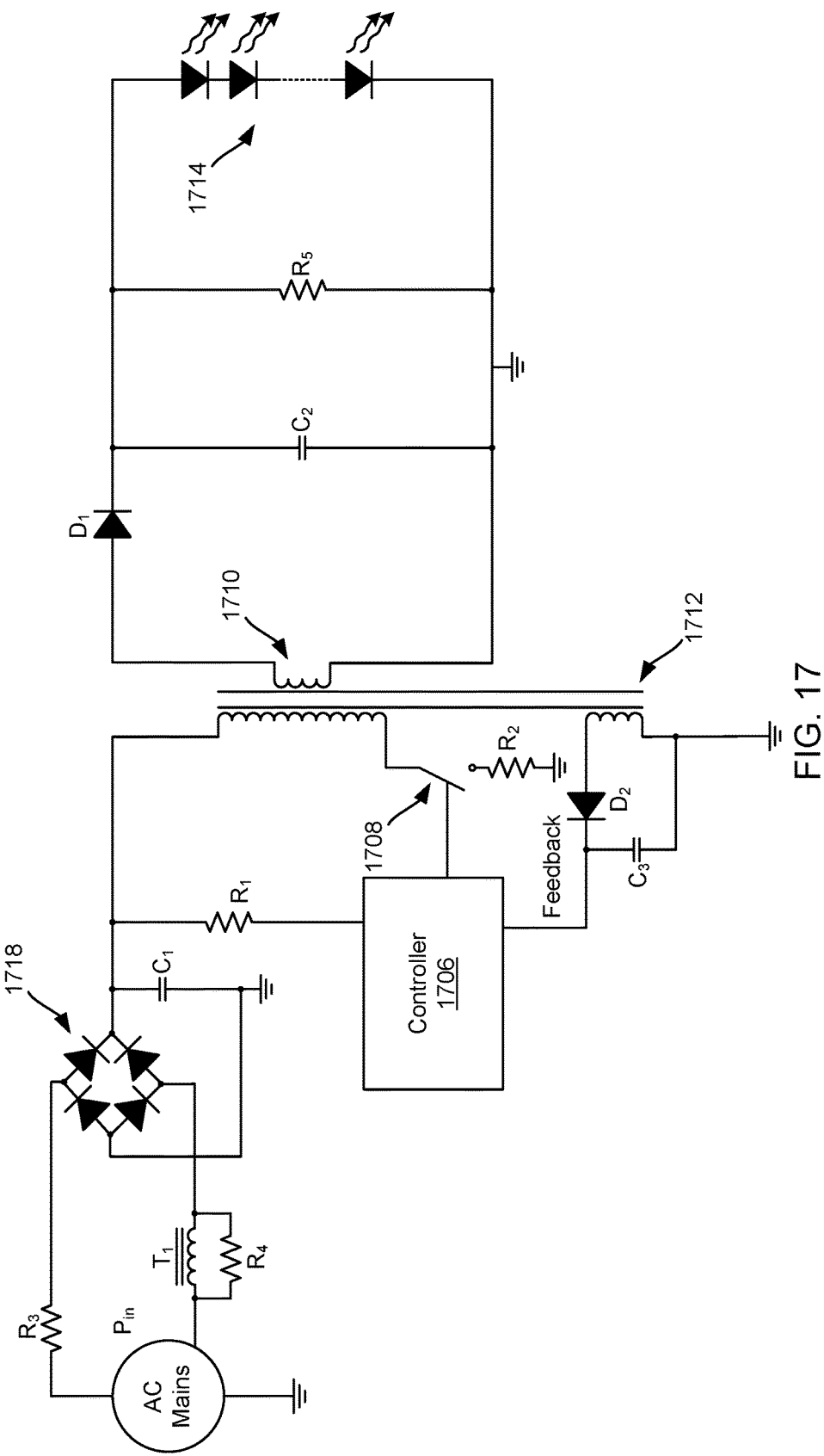
FIG. 17 illustrates another variation of an LED driver.
Figure 18:
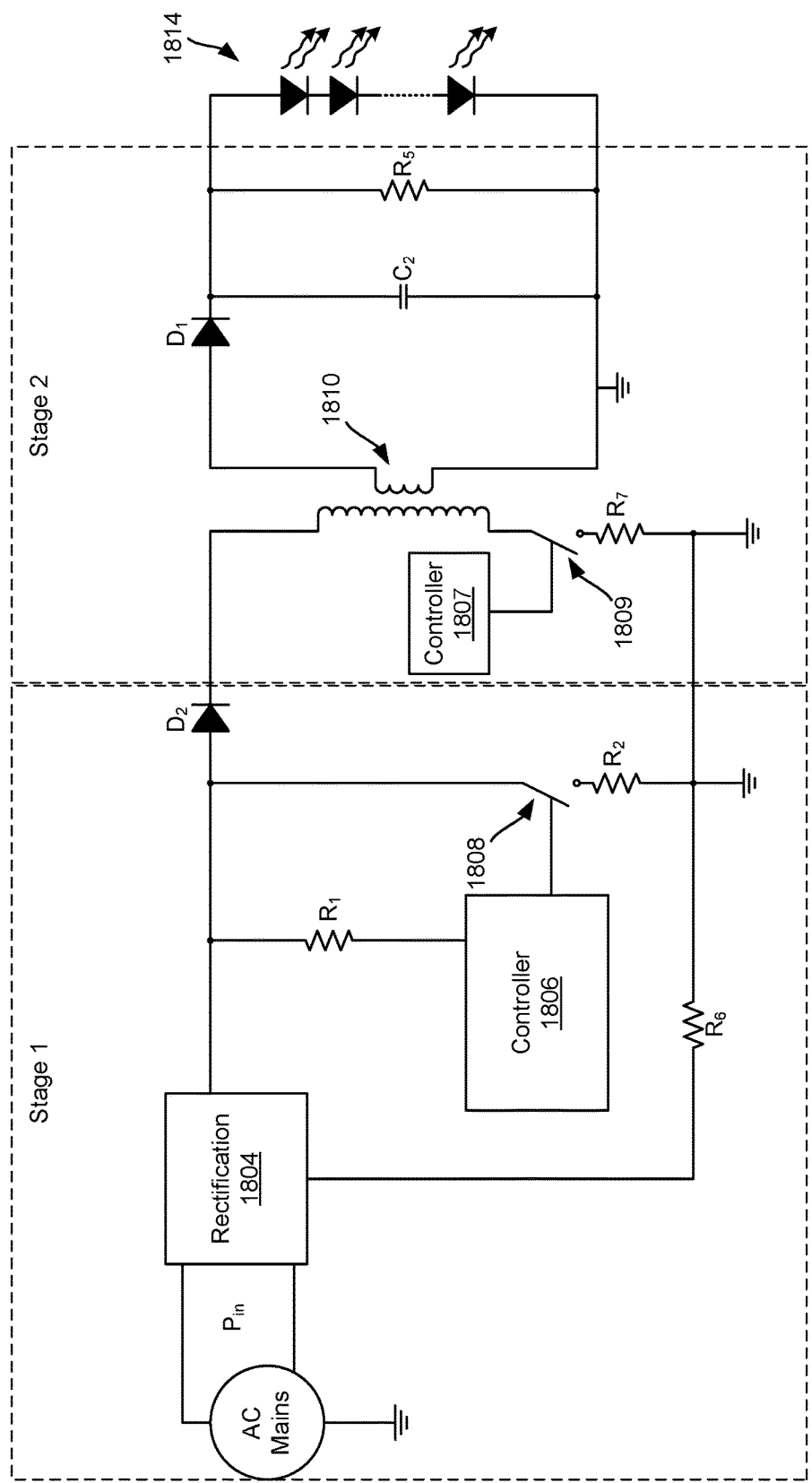
FIG. 18 illustrates one embodiment of a dual-stage driver where the transformer circuit is part of the second stage (voltage to current converter)

FIG. 16-18 illustrate some examples of different implementations of the LED driver systems described herein. FIG. 16 shows an LED driver receiving AC mains power, $P_{in}$, from an AC mains 1602 and providing regulated LED current to one or more LEDs 1614. The AC mains power can optionally be first rectified in rectification circuit 1604, although rectification can also occur after voltage regulation (or step down of the voltage). Once rectified, the power is delivered to a primary side of a transformer circuit 1610. The primary side of the transformer circuit 1610 is also coupled to ground via a switch 1608 and one or more resistive elements $R_2$. A controller 1606 is coupled to and controls the switch 1608 and monitors feedback from a feedback coil 1612 on the primary side. The controller 1606 can also monitor feedback from the input to the transformer circuit 1610 via resistive element $R_1$. The duty cycle that the controller 1606 imparts to the switch 1608 is proportional to the voltage out on the secondary side of the transformer circuit 1610. The controller 1606 can monitor zero crossings of the signal at the input to the transformer circuit 1610 or via the feedback coil 1612 and use this to determine when switching of the switch 1608 is to occur to minimize power losses. Also, the controller 1606 can receive indications or instructions to reduce power to the one or more LEDs 1614 (e.g., a dimming signal), and can turn the switch 1608 entirely off for select half cycles of the monitored signal. Where the output of the transformer circuit 1610 is provided to the one or more LEDs 1614, the driver can be considered a single-stage driver. However, those of skill in the art will understand how to add an optional voltage to current converter 1620 (e.g., a current regulator) to the output of the transformer circuit 1610 in order to form a dual-stage driver. The single-stage variation offers lower cost, complexity, and size. However, the dual-stage variation reduces ripple and stress on any capacitive elements between the transformer circuit 1610 and the one or more LEDs 1614.

FIG. 17 illustrates another variation of an LED driver. Here, a bridge rectifier 1718 performs rectification of the AC mains signal, although once again, the rectifier 1718 can be arranged on the secondary side of the transformer circuit 1710. A filter capacitor $C_1$ can be implemented between an output of the rectifier 1718 and ground. Feedback from a feedback coil 1712 on the primary side of the transformer circuit 1710 can pass through a diode, $D_2$, and be filtered by capacitor $C_3$ in parallel with the diode, $D_2$. Between the transformer circuit 1710 and the one or more LEDs 1714 a capacitor, $C_2$, and a resistive element, $R_5$, can be arranged in parallel between rails. Further, a diode, $D_1$, can limit current direction to the one or more LEDs 1714.

It should be noted that the power factor correction circuits shown in FIGS. 6, 14, and 15 can be implemented in single-stage or dual-stage drivers. Where a dual-stage driver is used, an output of the transformer circuits 612, 1412, and 1512 can be provided to a voltage to current converter or current regulator, which further smooths the output current for provision to one or more LEDs. Additionally, where a dual-stage topology is used, the transformer circuit 612, 1412, or 1512 can be moved to the voltage to current converter.

FIG. 18 illustrates one embodiment of a dual-stage driver where the transformer circuit is part of the second stage (voltage to current converter). Here, the first stage includes rectification circuit 1804, a controller 1806, and a switch 1808. The controller 1806 is coupled to and controls a switching of the switch 1808 to both achieve power factor correction and downconversion of the rectified power. However, the first stage does not provide isolation. The duty cycle of the switch 1808 can control a voltage provided to the second stage, but the power provided to the second stage can also be reduced via turning the switch 1808 off for select half cycles of the first stage power signal. The controller 1806 can monitor zero crossings of the power in the first stage via various means including feedback from the rail through resistive element $R_1$. The switch 1808 can be switched and turned on and off for cycle skips at the zero crossings identified by the controller 1806.

In the second stage a transformer circuit 1810 provides isolation between the high voltage primary side and the low voltage secondary side, where the one or more LEDs 1814 are arranged. The transformer circuit 1810 can be coupled to an output of the first stage and to ground through a second switch 1809 and a resistive element, $R_7$. The secondary side of the transformer circuit 1810 provides a stepped down voltage to one or more LEDs 1814 through diode, $D_1$. The secondary side also includes a capacitor $C_2$ and a resistive element, $R_5$, in parallel and in parallel to the one or more LEDs 1814, and arranged between rails of the secondary side.

Figure 19:
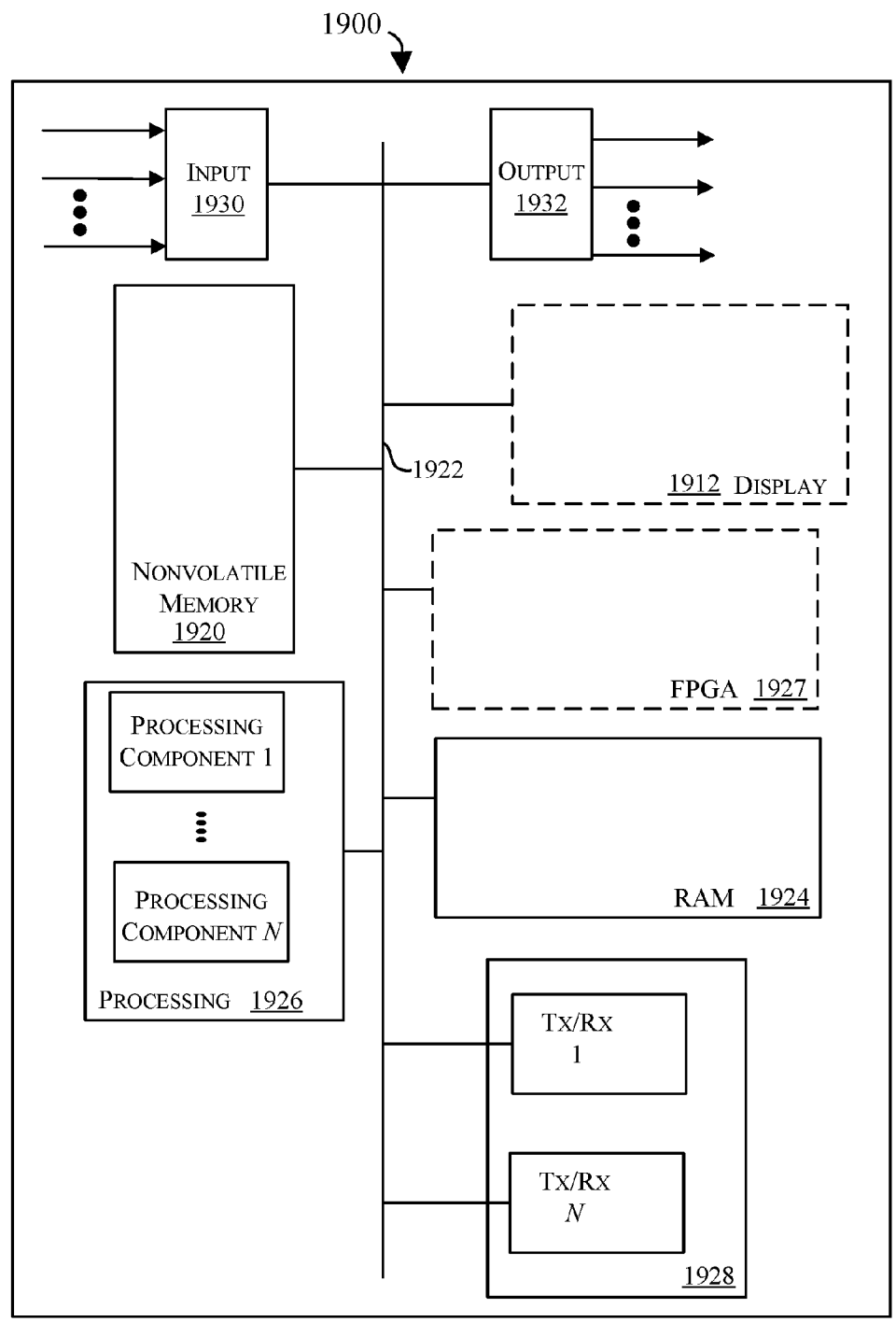
FIG. 19 illustrates one embodiment of a block diagram depicting physical components that may be utilized to realize any of the controllers herein disclosed.

The methods described in connection with the embodiments disclosed herein may be embodied directly in hardware, in processor-executable code encoded in a non-transitory tangible processor readable storage medium, or in a combination of the two. Referring to FIG. 19 for example, shown is a block diagram depicting physical components that may be utilized to realize any of the controllers herein disclosed (e.g., 616, 1016, 1330, the controllers of FIGS. 14 and 16, 1606, 1706, 1806) according to an exemplary embodiment. As shown, in this embodiment an optional display portion 1912 and nonvolatile memory 1920 are coupled to a bus 1922 that is also coupled to random access memory ("RAM") 1924, a processing portion (which includes N processing components) 1926, an optional field programmable gate array (FPGA) 1927, and a transceiver component 1928 that includes N transceivers. Although the components depicted in FIG. 19 represent physical components, FIG. 19 is not intended to be a detailed hardware diagram; thus many of the components depicted in FIG. 19 may be realized by common constructs or distributed among additional physical components. Moreover, it is contemplated that other existing and yet-to-be developed physical components and architectures may be utilized to implement the functional components described with reference to FIG. 19.

The optional display portion 1912 generally operates to provide a user interface for a user, and in several implementations, the display is realized by a touchscreen display. In general, the nonvolatile memory 1920 is non-transitory memory that functions to store (e.g., persistently store) data and processor-executable code (including executable code that is associated with effectuating the methods described herein). In some embodiments for example, the nonvolatile memory 1920 includes bootloader code, operating system code, file system code, and non-transitory processor-executable code to facilitate the execution of a method described with reference to FIGS. 5, 9, and 11 described further herein.

In many implementations, the nonvolatile memory 1920 is realized by flash memory (e.g., NAND or ONENAND memory), but it is contemplated that other memory types may be utilized as well. Although it may be possible to execute the code from the nonvolatile memory 1920, the executable code in the nonvolatile memory is typically loaded into RAM 1924 and executed by one or more of the N processing components in the processing portion 1926.

The N processing components in connection with RAM 1924 generally operate to execute the instructions stored in nonvolatile memory 1920 to enable reduction in power output from a PFC circuit while maintaining a constant input current (e.g., by switching a switch of a PFC circuit at a frequency greater than a frequency of an AC mains signal at an input of the PFC circuit, and turning the switch off for select half cycles of the AC mains signal). For example, non-transitory, processor-executable code to effectuate the methods described with reference to FIGS. 5, 9, and 11 may be persistently stored in nonvolatile memory 1920 and executed by the N processing components in connection with RAM 1924. As one of ordinarily skill in the art will appreciate, the processing portion 1926 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 1926 may be configured to effectuate one or more aspects of the methodologies described herein (e.g., the methods described with reference to FIGS. 5, 9, and 11). For example, non-transitory processor-readable instructions may be stored in the nonvolatile memory 1920 or in RAM 1924 and when executed on the processing portion 1926, cause the processing portion 1926 to perform methods for switching a switch of a PFC circuit. In particular, selecting a duty cycle that achieves a desired downcoversion of AC mains power to a voltage or current that can drive one or more LEDs, while also turning the switch off for select half cycles of the AC mains signal in order to reduce a power provided to the one or more LEDs (e.g., for dimming purposes). Alternatively, non-transitory FPGA-configuration-instructions may be persistently stored in nonvolatile memory 1920 and accessed by the processing portion 1926 (e.g., during boot up) to configure the hardware-configurable portions of the processing portion 1926 to effectuate the functions of the controllers described earlier in this disclosure.

The input component 1930 operates to receive signals (e.g., the voltage feedback from the secondary side of the transformer circuit of a PFC circuit) that are indicative of one or more aspects of the output of the transformer circuit of the PFC circuit. The signals received at the input component 1930 may include, for example, voltage, current, power, or a combination thereof. The output component 1932 generally operates to provide one or more analog or digital signals to effectuate an operational aspect of the controllers disclosed earlier in this disclosure. For example, the output portion 1932 may provide the control signals for controlling the switch described with reference to FIGS. 6, 10, 14-18.

The depicted transceiver component 1928 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

As will be appreciated by one skilled in the art, aspects of the present disclosure may be embodied as a system, method or computer program product. Accordingly, aspects of the present disclosure may take the form of an entirely hardware-based embodiment, an entirely software-based embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of operating a power factor correction circuit to drive a dimmable solid state lighting device, the method comprising:
   controlling downconversion of a voltage in the power factor correction circuit by periodically switching a switch, during switching periods, coupled between a high voltage rail and a ground rail of the power factor correction circuit, where a duty cycle of the switching corresponds to a ratio of input and output voltages from the power factor correction circuit;
   identifying zero crossings of power on the high voltage rail;
   determining a period of the power from the identifying; and
   turning the switch off during non-switching periods comprising one or more consecutive half cycles of the period, the non-switching periods interspersed between the switching periods, to reduce average power output from the power factor correction circuit, where a duty cycle of the non-switching periods corresponds to a ratio of input to output power from the power factor correction circuit;
   wherein a primary side of a transformer circuit is coupled between the high voltage rail and the switch and isolates an input from an output of the power factor correction circuit.

2. The method of claim 1, wherein instantaneous input current to the power factor correction circuit does not decrease when the average power output from the power factor correction circuit is reduced.

3. The method of claim 1, wherein the turning the switch off occurs at the zero crossings.

4. The method of claim 1, wherein an output of the power factor correction circuit provides regulated voltage to a current to voltage converter that provides regulated current to one or more light emitting diodes.

5. The method of claim 1, wherein an output of the power factor correction circuit provides regulated current to one or more light emitting diodes.

6. A method of operating a power factor correction circuit to drive a dimmable solid state lighting device, the method comprising:
   controlling downconversion of a voltage in the power factor correction circuit by periodically switching a switch, during switching periods, coupled between a high voltage rail and a ground rail of the power factor correction circuit, where a duty cycle of the switching during switching periods corresponds to a ratio of input and output voltages from the power factor correction circuit;
   providing a transformer circuit between the high voltage rail and the switch to isolate a primary side from a secondary side of the power factor correction circuit;
   identifying zero crossings of power before or after the transformer circuit or via a second primary coil of the transformer circuit;
   determining a period of the power from the identifying;

turning the switch off for non-switching periods comprising one or more consecutive half cycles of the period, the non-switching periods interspersed between the switching periods, to reduce average power output from the power factor correction circuit, where a duty cycle of the non-switching periods corresponds to a ratio of input to output power from the power factor correction circuit.

7. The method of claim 6, wherein instantaneous input current to the power factor correction circuit does not decrease when the average power output from the power factor correction circuit is reduced.

8. The method of claim 6, wherein the turning the switch off occurs at the zero crossings.

9. The method of claim 6, wherein an output of the power factor correction circuit provides a regulated voltage to a voltage to current converter that provides a regulated current to one or more light emitting diodes.

10. The method of claim 6, wherein an output of the power factor correction circuit provides a regulated current to one or more light emitting diodes.

11. A power factor correction circuit, the circuit comprising:
a power factor correction circuit input;
a power factor correction circuit output;
a high voltage rail;
a ground rail;
a switch coupled between the high voltage rail and the ground rail; and
a controller controlling switching of the switch, during switching periods, at a duty cycle corresponding to a downconversion ratio between a voltage at the power factor correction circuit input and a voltage at the power factor correction circuit output, the controller programmed or wired to:
identify zero crossings of power on the high voltage rail, at an isolation transformer coupled between the high voltage rail and the switch, or at the power factor correction circuit output;
determine a period of the power from the identifying; and
turn the switch off for non-switching periods comprising one or more consecutive half cycles of the period, the non-switching periods interspersed between the switching periods, to reduce average power output from the power factor correction circuit, where a duty cycle of the non-switching periods corresponds to a ratio of input to output power from the power factor correction circuit.

12. The power factor correction circuit of claim 11, further comprising a transformer circuit coupled between the high voltage rail and the switch.

13. The power factor correction circuit of claim 11, wherein the power factor correction circuit output is configured to couple to a voltage to current converter, which provides regulated current to one or more light emitting diodes.

14. The power factor correction circuit of claim 11, wherein the power factor correction circuit output is configured to couple to one or more light emitting diodes and provide a regulated current to the one or more light emitting diodes.

15. The power factor correction circuit of claim 11, further comprising an optical isolator for providing feedback from a secondary side of a transformer circuit to the controller, wherein the feedback is used to identify the zero crossings.

* * * * *